United States Patent
Griffin

(10) Patent No.: US 10,855,473 B1
(45) Date of Patent: Dec. 1, 2020

(54) SYSTEMS AND METHODS FOR BIOMETRIC ELECTRONIC SIGNATURE AGREEMENT AND INTENTION

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 137 days.

(21) Appl. No.: 15/870,650

(22) Filed: Jan. 12, 2018

Related U.S. Application Data

(60) Provisional application No. 62/599,507, filed on Dec. 15, 2017.

(51) Int. Cl.
*H04L 9/08* (2006.01)
*H04L 9/32* (2006.01)

(52) U.S. Cl.
CPC .......... *H04L 9/3247* (2013.01); *H04L 9/0866* (2013.01); *H04L 9/3213* (2013.01); *H04L 9/3242* (2013.01)

(58) Field of Classification Search
CPC ... H04L 9/3231; H04L 9/3247; H04L 9/0866; H04L 9/14; H04L 9/30; H04L 9/3236; H04L 9/3263; H04L 9/3297
See application file for complete search history.

(56) References Cited

U.S. PATENT DOCUMENTS

| | | | |
|---|---|---|---|
| 5,764,789 A * | 6/1998 | Pare, Jr. ................. | G06Q 20/02 382/115 |
| 7,039,805 B1 | 5/2006 | Messing | |
| 2014/0019766 A1 | 1/2014 | Takahashi et al. | |
| 2015/0215316 A1* | 7/2015 | Zeljkovic ............ | H04L 63/0884 726/6 |
| 2015/0280921 A1 | 10/2015 | Geoffrey | |
| 2016/0020909 A1* | 1/2016 | Gardenes Linan ......... | G06Q 10/1091 713/175 |

(Continued)

OTHER PUBLICATIONS

Fong, et al., "A biometric authentication model using hand gesture images," Biomedical Engineering Online, vol. 12, No. 111 (Oct. 30, 2013). 18 pages.

(Continued)

*Primary Examiner* — Trang T Doan
(74) *Attorney, Agent, or Firm* — Foley & Lardner LLP

(57) ABSTRACT

A method comprises receiving, by a computing system, a secret knowledge factor, and a biometric sample from a signing party. The biometric sample comprises at least one of an approval sample and an intent sample. The computing system generates an encryption key using the secret knowledge factor as an input to a password authenticated key exchange protocol, and encrypts the biometric sample with the encryption key. The computing system generates a biometric electronic signature agreement and intent ("BESAI") token including the encrypted biometric sample, and a signing party identifier in clear text associated therewith. The BESAI token can be verified using a decryption key generated using a stored knowledge factor as an input to the password authenticated key exchange protocol, and the approval of terms of and confirmation of intent to sign the electronic agreement by the signing party can be verified after decrypting the biometric sample.

44 Claims, 5 Drawing Sheets

(56) References Cited

U.S. PATENT DOCUMENTS

| | | | | |
|---|---|---|---|---|
| 2016/0203496 A1* | 7/2016 | Guerrero | ............ | G06Q 30/0185 705/39 |
| 2016/0330027 A1* | 11/2016 | Ebrahimi | .............. | H04L 9/0637 |
| 2017/0116615 A1* | 4/2017 | Burgess | ............... | G06Q 20/322 |

OTHER PUBLICATIONS

Gilady et al., "Intent Biometrics: An Enhanced Form of Multimodal Biometric Systems," 28th International Conference on Advanced Information Networking and Applications Workshops (May 13, 2014-May 16, 2014). 5 pages.

Griffin et al., "Secure Authentication on the Internet of Things," IEEE Southeast Conference (2017. 5 pages.

Griffin, "Adaptive Weak Secrets for Authenticated Key Exchange," Advances in Human Factors in Cybersecurity—Advances in Intelligent Systems and Computing, vol. 593, p. 16-25 (2018).

Griffin, "Transport Layer Secured Password-Authenticated Key Exchange," Information Systems Security Association Journal, vol. 13, No. 6 (Jun. 2015). 6 pages.

Larmouth, "ASN.1 Complete," Open Systems Solutions (May 31, 1999) 387 pages.

Manulis et al., "Secure Modular Password Authentication for the Web Using Channel Bindings," Int. J. Inf. Secur., (Springer) Published online Sep. 12, 2016, 15:597-620. 24 pages.

Vicars, "American Sign Language Fingerspelling & Numbers: Introduction," http://www.lifeprint.com/asl101/fingerspelling/fingerspelling.htm; American Sign Language University (2011). 6 pages.

Yang et al., "Consent Biometrics," Department of Electrical and Computer Engineering IUPUI (2011). 6 pages.

\* cited by examiner

SYSTEMS AND METHODS FOR BIOMETRIC ELECTRONIC SIGNATURE AGREEMENT AND INTENTION

CROSS-REFERENCE TO RELATED APPLICATION

This application claims priority to U.S. Provisional Patent Application No. 62/599,507, entitled "SYSTEMS AND METHODS FOR BIOMETRIC ELECTRONIC SIGNATURE AGREEMENT AND INTENTION," filed Dec. 15, 2017, which is incorporated herein by reference in its entirety and for all purposes.

BACKGROUND

Access control systems may use one or more authentication factors to verify an individual's identity. For example, authentication factors may include "something-you-know," "something-you-have," and "something-you-are." Some access control systems may require elements from two or three of these categories to provide two- or three-factor authentication.

Biometrics may provide the "something-you-are" factor used for identification and authentication. Biometrics can be coupled with other categories of factors, such as "something-you-have" and "something-you-know," to achieve two- and three-factor authentication when greater assurance is required than a single factor can provide. Biometric traits may include, for example, biological (e.g., fingerprint, iris, hand geometry, audio/visual, etc.) and behavioral (e.g., gait, gesture, keystroke dynamics, etc.) characteristics that reliably distinguish one person from another.

As transactions, interactions, and communications occur over various internet-centric services via personally-owned mobile devices, the actual identities of the parties involved may be unknown. While the internet adds convenience, the identity of the transacting parties is, at times, unknown or unverified. Even authentication systems with username and password login restrictions are susceptible to hacking, password compromise, man-in-the-middle attacks, phishing, or use by an entity that is not the intended authenticating person. Accordingly, protection of personally identifiable information ("PII") needs to be efficient and effective, providing assurance of the identity of the party while not compromising any sensitive information or slowing down information exchange processes with heavy (e.g., processor-intensive) protection mechanisms.

Some authentication systems may include the use of an electronic signature ("e-signature"). For example, an electronic agreement ("e-agreement") may include an electronic signature which a signing party may input into a computing system in lieu of the signing party's actual physical signature, implying that the signing party agrees to and accepts the terms of the electronic agreement. An e-signature is intended to provide a secure and accurate identification method for the signatory to provide a seamless transaction to a relying party. Definitions of e-signatures vary depending on the applicable jurisdiction. For example, the United States is governed under the Electronic Signatures in Global and National Commerce Act ("ESIGN") and the Government Paperwork Elimination Act ("GPEA"). Under the ESIGN, an e-signature is defined as an electronic sound, symbol, or process, attached to or logically associated with a contract or other record and executed or adopted by a person with the intent to sign the record. Additionally, under United States federal law, the GPEA further defines the term "electronic signature" to mean a method of signing an electronic message that: (A) identifies and authenticates a particular person as the source of the electronic message and (B) indicates such person's approval of the information contained in the electronic message.

In some instances, a signing party may rescind an e-agreement that was previously electronically signed by the signing party. For example, the signing party (e.g., an individual, a conglomerate or a business that originally signed the agreement) may assert that the signing party misunderstood the terms of the agreement, did not intend to sign the agreement, or signed the electronic agreement under duress. In such instances, the only proof that the signing party agreed to the terms of the agreement and intended to sign the agreement may be the electronic signature, which may not be sufficient to prove that the signing party approved the terms of the agreement and intended to sign the agreement (e.g., in a court of law).

SUMMARY

Arrangements described herein relate generally to systems and methods for capturing a biometric sample as evidence of a signing party's agreement to terms of an electronic agreement and intention to sign an electronic agreement and associating the biometric sample to a record of an electronic agreement for later extraction and use as evidence in the instance that the signing party rescinds the electronic agreement.

In some arrangements, a method includes receiving, by a computing system from a signing party, a secret knowledge factor. The computing system receives a biometric sample from the signing party. The biometric sample includes at least one of: an approval sample including a first biometric representation of the signing party's approval of terms of an electronic agreement and an intent sample including a second biometric representation of confirmation of the signing party's intent to sign the electronic agreement. The computing system generates an encryption key using the secret knowledge factor as an input to a password authenticated key exchange protocol. The computing system encrypts the biometric sample with the encryption key. The computing system generates a biometric electronic signature agreement and intent ("BESAI") token including the encrypted biometric sample, and a signing party identifier in clear text associated therewith. The BESAI token can be verified using a decryption key generated using a stored knowledge factor as an input to the password authenticated key exchange protocol. The stored knowledge factor is retrieved based on the signing party identifier. Furthermore, the approval of the terms of the electronic agreement and confirmation of intent to sign the electronic agreement by the signing party can be verified after decrypting the biometric sample.

In some arrangements, a method includes receiving, by a computing system associated with a relying party, a BESAI token. The BESAI token includes an encrypted biometric sample received from a signing party, and a signing party identifier in clear text associated therewith. The computing system retrieves the stored knowledge factor. The computing system generates a decryption key using the stored knowledge factor as an input to the password authenticated key exchange protocol. The stored knowledge factor is based on the signing party identifier. The computing system verifies the BESAI token using the decryption key. The computing system determines if the signing party rescinds an electronic agreement associated with the BESAI token. In response to the signing party rescinding the electronic agreement, the computing system extracts the biometric sample from the BESAI token. The computing system transmits the biometric sample to the signing party as evidence. The biometric sample includes at least one of: an approval sample including a first biometric representation of the signing party's approval of terms of the electronic agreement and an intent sample including a second biometric representation of confirmation of the signing party's intent to sign the electronic agreement.

In some arrangements, a system including a signing party computing system, includes a processor and instructions stored in non-transitory machine-readable media, the instructions configured to cause the computing system to receive a secret knowledge factor. The computing system is configured to receive a biometric sample. The biometric sample includes at least one of: an approval sample including a first biometric representation of the signing party's approval of terms of an electronic agreement, and an intent sample including a second biometric representation of confirmation of the signing party's intent to sign the electronic agreement. The computing system is configured to generate an encryption key using the secret knowledge factor as an input to a password authenticated key exchange protocol. The computing system is configured to encrypt the biometric sample with the encryption key. The computing system is also configured to generate a BESAI token including the encrypted biometric sample, and a signing party identifier in clear text associated therewith. The BESAI token can be verified using a decryption key generated using a stored knowledge factor as an input to the password authenticated key exchange protocol. The stored knowledge factor is retrieved based on the signing party identifier. Furthermore, the approval of the terms of the electronic agreement and confirmation of intent to sign the electronic agreement by the signing party can be verified after decrypting the biometric sample.

In some arrangements, a method includes receiving, by a computing system, a first knowledge factor and a second knowledge factor from a signing party indicative of the signing party's intent to sign an electronic agreement. The computing system transmits a request to the signing party to record a biometric sample. The biometric sample includes at least one of: an approval sample including a first biometric representation of the signing party's approval of terms of the electronic agreement and an intent sample including a second biometric representation of confirmation of the signing party's intent to sign the electronic agreement. The computing system receives the biometric sample. The computing system encrypts the biometric sample, a record identifier, and at least one of the first knowledge factor and the second knowledge factor in a record of the electronic agreement. The computing system determines if the signing party rescinds the electronic agreement. In response to determining that the signing party rescinds the electronic agreement, the computing system decrypts the record using at least one of the first knowledge factor and the second knowledge factor. The computing system extracts the biometric sample from the record as evidence of the signing party's approval of the terms and of the signing party's intention to sign the electronic agreement.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
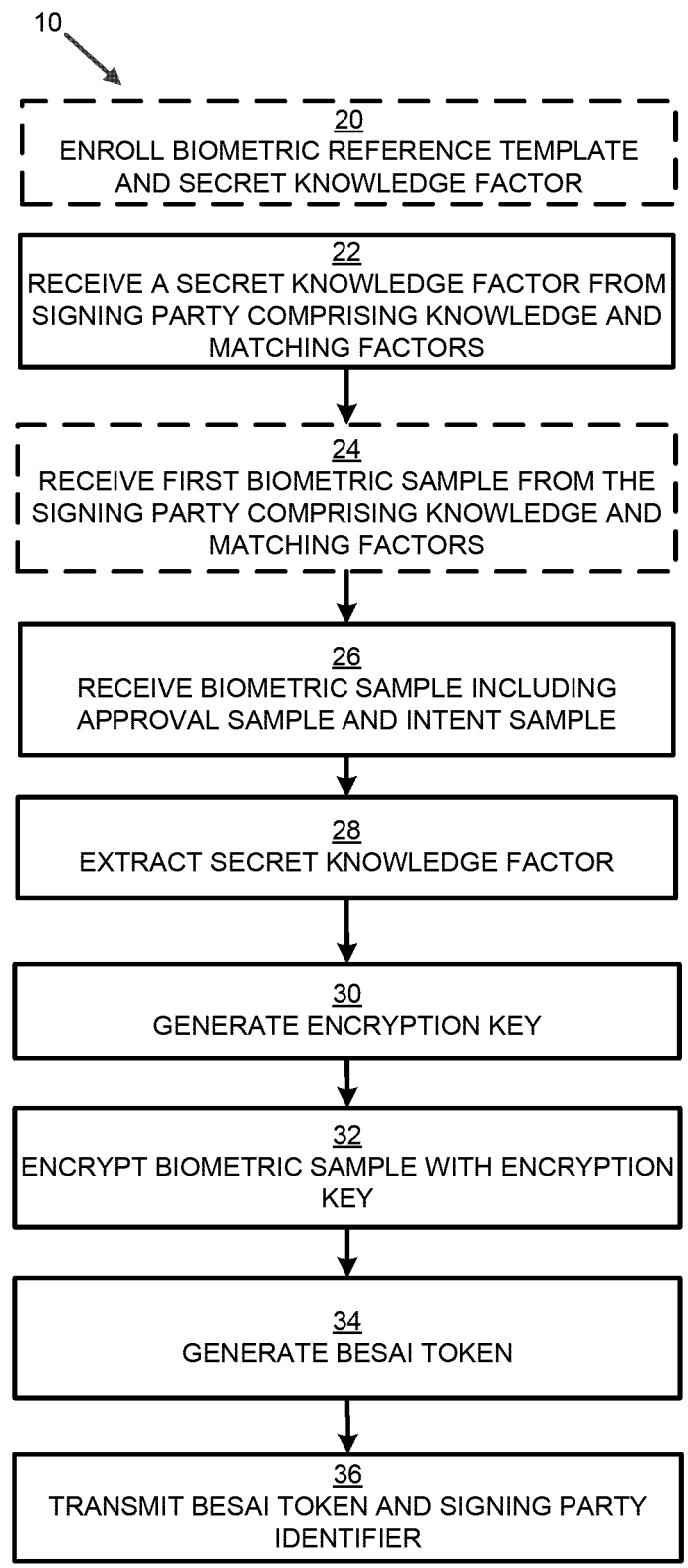
FIG. 1 is a flow diagram illustrating a method of generating a BESAI token, according to an arrangement.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Authentication factors for access control systems may include "something-you-know," "something-you-have," and "something-you-are" factors. Access control systems typically collect values for each authentication factor category separately, for example, utilizing a token reader, a keyboard, and a biometric sensor for three-factor authentication. However, binary data collected from biometric sensors can contain rich information content not limited to only the physiological and behavioral characteristics needed to support biometric matching.

Biometric sensor-collected data can contain human knowledge, which may provide the "something-you-know" information used for authentication. Knowledge extraction techniques applied to this data can reveal "weak" secrets expressed by an individual. These secrets are termed weak because they are something a person can easily memorize, such as a passphrase, a password, or a personal identification number ("PIN"). Biometric-based weak secrets may extend these traditional secrets to also include a sequence of footsteps or the finger positions and hand postures used in a gesture (e.g., during communication of hand sign languages when they can be captured and then represented in a canonical form such as a character string).

A password is a "something-you-know" authenticator which may include a string of characters that have an equivalent representation shared by communicating parties. This equivalency makes passwords useful as weak secrets in cryptographic key-agreement schemes, which require both parties to know exactly the same secret in order to establish a shared key to ensure secure communications. Although knowledge extracted from biometric sensors can have this useful equivalency attribute of passwords, often it does not occur without subsequent processing.

Server authentication mechanisms, such as the widely deployed Transport Layer Security ("TLS") protocol, rely on strong asymmetric cryptography supported by a resource intensive Public Key Infrastructure ("PKI"). However, achieving mutual authentication using TLS is not so common. It is more likely for client authentication to rely on signing party passwords because most users lack the personal digital certificates needed to leverage the mutual authentication option of TLS.

Passwords and other shareable knowledge-based authentication values are typically used for client-side authentication only, with TLS serving to authenticate the server and protect client passwords in transit. Failures in TLS server authentication and signing party errors have led to widespread phishing by attackers impersonating legitimate servers to capture signing party credentials. Consequently, there is a need to provide a strong cryptographic protocol that overcomes the shortcomings of TLS.

Currently, transactions and communications over the internet fail to provide the level of certainty many transactions require. For example, a requesting party may require an intended signing party to sign a document by sending it to the authenticating party's known email address. At a later time, the requesting party receives, via email, the document digitally signed with an "Is" signature or similar designation of signature. In this common use case, the requesting party cannot be certain that the actual signer of the document is the intended authenticating person; all that is known is that someone with credentials to access the document accessed the document, signed it and sent it back. However, authentication systems with username and password login signature set up are susceptible to hacking, password compromising, or use by an entity that is not the intended authenticating person. Currently, an alternative to the alternative to digital "Is" signatures includes the requesting party requiring the authenticating person to print the document, travel to a notary, sign the document in front of the notary, upload the signed document, and transmit the document to the requesting party with the physical signature of the authenticating party and notary stamp. While this method increases the certainty of the identity of the authenticating individual, it lacks the efficiency and convenience inherent in internet-based (e.g., online) transactions and communications. Accordingly, there is a need for an authentication-based system for confirming or signing internet-centric interactions that provides greater assurance of identity while maintaining the speed, convenience, and efficiency of internet-centric transactions.

Furthermore, in some instances, a signing party may rescind an electronic agreement that was previously electronically signed by the signing party. For example, the signing party (e.g., an individual, a conglomerate or a business) may assert that the signing party misunderstood the terms of the agreement, did not intend to sign the agreement or signed the electronic agreement under duress. In such instances, the only proof that the signing party agreed to the terms of the agreement and intended to sign the agreement may be the electronic signature, which may not be sufficient to prove the signing party's agreement to the terms of the agreement and intention to sign the agreement by a relying party to the agreement (e.g., in a court of law).

As used herein, the terms "electronic agreement," "e-agreement" and "agreement" are used interchangeably to describe an electronic record of any agreement, contract, legally binding obligation or any other document including one or more terms provided by a relying party and electronically signed by a signing party. Referring generally to the figures, arrangements described herein relate generally to systems and methods for mutual and multi-factor authentication, as well as associating a biometric sample with an electronic agreement. The biometric sample includes a biometric record of a signing party agreeing to the terms of the agreement and confirming intent to sign the agreement via a BESAI processing system for generating and verifying a BESAI token. Generally, the BESAI processing system provides multi-factor authentication of a signing party (e.g. an account holder, a user, etc.) to a relying party (e.g., a financial institution) without the requirement or use of a digital signature or a PKI. The BESAI token is a biometrics-based electronic signature on a record (e.g., a contract, mortgage, business transaction, etc.) that utilizes the hybrid cryptographic technique of authenticated encryption and an authenticated key exchange to encrypt the information in the BESAI token. Unlike passwords, biometric matching data is not a shareable authenticator because biometric reference data and biometric matching data are not equivalent.

As will be appreciated, the BESAI processing system may be used to generate and verify BESAI tokens in connection with e-commerce transactions or other types of signing events, such as, for example those involving cloud-based, blockchain-based, distributed ledgers, or smart contract systems. The BESAI token provides a signing party the ability to provide one or more biometric samples from the signing party and a record of the agreement, both of which are encrypted (e.g., protected) under authentication encryption, thereby providing assurance of the identity of the token (e.g., record and sample) to a relying party through the authenticated key exchange process. Furthermore, the BESAI token also encrypts an evidence biometric sample which includes a biometric record of a signing party approval of the terms of the agreement and confirmation of intent to sign the agreement, with the record of the agreement. The evidence biometric sample may be later extracted if the signing party rescinds the agreement, and provided to the signing party or to a court of law as evidence of the signing party's approving the terms of the agreement and intention to sign the agreement.

The BESAI token makes use of authenticated encryption to produce a ciphertext (e.g., data that has been transformed by a cryptographic operation to hide its information content). To generate the BESAI token, the signing party provides a record (e.g., document), a biometric sample (e.g., a first biometric sample and a second biometric sample), a secret knowledge factor, and a signing party identifier. The secret knowledge factor may be extracted by the BESAI processing system from the provided biometric sample. In some arrangements, the signing party may provide the secret knowledge factor by entering the secret knowledge factor into a field on a computing device (e.g., mobile phone, a tablet, a laptop computer, a desktop computer or a server associated with the signing party). Subsequently, the BESAI token may be utilized to authenticate a signing party to facilitate secure, encrypted transactions with the relying party (for example, a financial institution) by extracting knowledge data from the biometric sample provided by the signing party in addition to the biometric matching, thereby accomplishing multi-factor authentication. Moreover, the biometric sample, (e.g., the evidence biometric sample) may be later extracted if the signing party rescinds the agreement and may be provided to the signing party or to a court of law as evidence of the signing party's approval of the terms of the agreement and confirmation of intent to sign the agreement.

Various arrangements of the BESAI token described herein can be implemented in any number of combinations with other encryption and token generation technologies modified to include the evidence biometric sample. Examples to such encryption and token generation technologies are described in U.S. patent application Ser. No. 15/299, 308, filed Oct. 20, 2016 and entitled "Biometric Electronic Signature Tokens," and U.S. patent application Ser. No. 15/345,111, filed Nov. 7, 2016 and entitled "Signcrypted Biometric Electronic Signature Tokens," the entire disclosures of which are incorporated herein by reference. In some arrangements, the BESAI token may include a biometric electronic signature authenticated key exchange ("BE-SAKE") token modified to include the evidence biometric sample including the approval sample and the intent sample described herein. Details of the BESAKE token can be found in U.S. patent application Ser. No. 15/623,213, filed Jun. 14, 2017 and entitled "Biometric Electronic Signature Authenticated Key Exchange Token," the entire disclosure of which is incorporated herein by reference.

According to some arrangements, a signing party can utilize a BESAI token to provide a biometric-based electronic signature. In some arrangements, the biometric-based electronic signature may be on a document or record. The signing party provides a biometric sample for authentication. The biometric sample contains, and is parsed into, secret knowledge data, such as a "something-you-know" weak secret (e.g., a password), and biometric matching data, such as a "something-you-are" strong secret (e.g., a voice profile, fingerprint, etc.). Furthermore, the biometric sample may also include a biometric sample, including one or more components, confirming the signing party's agreement to the terms of the electronic agreement and intention to sign the electronic agreement (e.g., a confirming phrase, a visual agreement and confirmation of intent, a thumbprint, etc.). For example, the biometric sample may include an approval sample, comprising a first biometric representation of the signing party's approval of terms of an electronic agreement, and an intent sample, comprising a second biometric representation of confirmation of the signing party's intent to sign the electronic agreement. In some arrangements, the BESAI token may include a single biometric sample used for authentication as well as evidence. In other arrangements, the BESAI token may include a first biometric sample (e.g., an authentication biometric sample) used for authentication (e.g., one factor of a multifactor authentication protocol), and a second biometric sample (e.g., an evidence biometric sample), which may be used as evidence of the signing party's approval of the terms of the agreement and confirmation of intent to sign the agreement.

An encryption key (e.g., a symmetric encryption key) is created using the extracted secret knowledge data (e.g., using a Password Authenticated Key Exchange Protocol). The symmetric encryption key is used to encrypt the biometric matching data and record to generate the BESAI token. Some arrangements utilize a key agreement scheme (e.g., key exchange protocol), such as Diffie-Hellman ("D-H"), to create the symmetric encryption key. This key protects the confidentiality of signing party credentials and other message data transferred during operation of the BESAI protocol. The BESAI token and a signing party identifier associated with the signing party are then transmitted to an authentication system (e.g., a relying party computing system).

To verify the BESAI token, the authentication system (e.g., a relying party computing system) may match the signing party identifier to a stored knowledge factor and generate a decryption key based on the stored knowledge factor. In some arrangements, the stored knowledge factor is established (e.g., provided by the signing party or assigned to the signing party by the authentication system) when the signing party establishes an account with the authentication system. The stored knowledge factor may also be changed periodically by the signing party. The decryption key may be used to decrypt the BESAI token and retrieve the biometric matching data and record. The secret knowledge data (e.g., signing party secret) may be extracted from the biometric matching data.

The signing party is authenticated with a single authentication factor if the secret knowledge data extracted from the biometric matching data matches the stored knowledge factor. The biometric matching data may also be matched with a biometric reference template associated with the signing party to authenticate the signing party with a second authentication factor. In this regard, the "something-you-are" identification factor is achieved through a biometric authentication process including verification or identification. Verification is the process of comparing a biometric match template against a specific biometric reference template based on a claimed identity (e.g., user ID, account number, etc.). Identification is the process of comparing a submitted biometric sample against some or all enrolled reference templates to determine an individual's identity. In some arrangements, the BESAI processing system may require that a user first enrolls in a biometric system to generate a biometric reference template that can be used for subsequent biometric matching to verify the user's identity via a biometric sample acquired from the user. In other arrangements, the BESAI processing system may generate a biometric reference template from the user-provided biometric sample so that the user can be enrolled in a biometric systems for subsequent biometric authentication or identification.

In some arrangements, the BESAI processing system is used to store a BESAI token or the components of an BESAI token in a storage location within a remote procedures call ("RPC") or smart contract code (e.g., the BESAI token wrapped in executable code or accessible by code) to aid in a transfer of value. When the contract conditions are met, the BESAI token is transmitted to an individual, an entity, or a location. Expanding generally, a smart contract is a code that consists of legal prose, executable code, and parameter(s) that must be achieved to execute the smart contract. The parameters vary by contract instance, such as terms, amounts, dates, etc., and the executable code would be initiated upon achievement of one or more of the parameters (as dictated by the legal contract). Utilizing the BESAI processing system, a BESAI token may be wrapped in executable code as part of a smart contract and stored in a distributed ledger, blockchain, or similar storage location. Alternatively, a signing party may provide their biometric sample, indicating confirmation and intent to sign the agreement (with knowledge factor), attached to a record along with an ACCEPT indicator and a signing party indicator.

These components may be wrapped in executable code and stored in a distributed ledger, blockchain, or similar storage location. When the contract conditions are met, the record and biometric sample are encrypted, generating the BESAI token. In both arrangements, the BESAI token can be stored, and subsequently retrieved, on a distributed ledger or blockchain, or the BESAI token may be transmitted to an entity to complete the contract. For example, using the implementation described above, a signing party sets up a recurring payment (e.g., bill, subscription service, mortgage, etc.) and inserts a BESAI token (or the components of a BESAI token) in the payment smart contract stored on a distributed ledger. On the 1st day of each month for 10 years, the smart contract code is initiated such that the BESAI token is compiled, encrypted, and sent off to the appropriate entity. This process causes a transfer of value from an account of the signing party to the payment recipient's account. Alternatively, this implementation could be used to preauthorize the sale of stock or the purchase of stock on condition that the stock price falls to or below a designated amount. Furthermore, a record of agreement initially setup via the BESAI token authorizing the relying party to the monetary transactions also includes the evidence biometric sample confirming that the signing part approved the terms of the agreement, and that the signing party's intended to sign the agreement. The evidence biometric sample may be extracted and used as evidence against the signing party by the relying party in the event that the signing party rescinds the agreement.

The BESAI protocol ensures users (e.g., signing parties) never reveal their knowledge or biometric credentials to imposter recipients or man-in-the-middle observers. D-H key agreement allows two parties to establish a cryptographic key without ever actually exchanging the private value. According to various arrangements, an authenticator constructed from knowledge extracted from biometric sensor data is used in D-H based Authenticated Key Exchange ("AKE") protocols. The authenticator may serve in place of a password string. According to various arrangements, participants in the exchange represent the knowledge information in a consistent and unambiguous format, such as a canonical encoding based on Abstract Syntax Notation One ("ASN.1"), allowing protocol participants to share precisely the same secret knowledge factor (e.g., signing party password, signing party secret) required to operate the protocol.

The BESAI processing system provides communicating parties assurance they know each other (e.g., mutual authentication), aids in establishing a shared secret—a symmetric cryptographic key—for secure communications known only to them for at least the communication involving the BESAI token, and provides the relying party to the agreement assurance in the instance that a signing party rescinds the agreement. The BESAI processing system accomplishes signing party authentication implicitly through establishing an authenticated session key. BESAI utilizes a combined biometrics password through a version of the AKE protocol to provide a stronger, faster alternative to TLS. According to various arrangements, BESAI may be used to authenticate a signing party (e.g. an account holder at a financial institution) to facilitate secure, encrypted transactions with the financial institution. As will be appreciated, a signing party can seamlessly and quickly provide a multi-factor authentication BESAI token, containing a signing party biometric sample (e.g., a first biometric sample and a second biometric sample) and a record over a network instead of the conventional process of providing a physical signature on a record in tandem with an identity vetting process (e.g., in front of a notary with a state-issued license).

The BESAI processing system provides technical solutions to computer-centric and internet-centric problems associated with conventional biometrics and authentication systems. For example, an BESAI token, according to various arrangements, provides a more efficient and effective authentication mechanism by providing multi-factor and mutual authentication from a biometrics-based protocol in place of TLS or other server authentication options when a challenge response mechanism is used and provides assurance to a relying party that a signing party will not rescind the agreement. The BESAI processing system protocol is biometrics independent, allowing multiple biometric types to be used to facilitate the mutual authentication. The BESAI processing system protocol ensures that communicating parties never reveal their knowledge or biometric credentials to imposter recipients or man-in-the-middle observers. Further, the BESAI processing system provides mutual authentication while avoiding the TLS server-specific authentication errors and signing party errors that have resulted in data breaches and phishing attacks. Additionally, the BESAI processing system protocol overcomes the TLS and other server authentication systems limitations of mutual authentication procedures being dependent on personal (e.g., on possession of the user) digital certificates. The BESAI processing system overcomes this limitation by leveraging a signing party password in the BESAI processing system protocol and providing a strong, lightweight alternative to TLS and other server authentication systems.

The BESAI processing system provides technical solutions to computer-centric and internet-centric problems associated with conventional biometrics and authentication systems by providing confidentiality of PII without the use of tokenization or a PKI. By using cryptography that does not require the support of a PKI, the BESAI processing system reduces the processing power and memory currently required to achieve multi-factor and mutual authentication on resource constrained devices. Additionally, the arrangements herein utilize a strong key exchange mechanism that utilizes a symmetric encryption and decryption method that may be 100 to 10,000 times faster than authentication protocols using asymmetric encryption algorithms while maintaining the same, or greater, protection of the underlying passcode information in the authentication data exchange between the communicating parties. For example, the key exchange mechanism gives protection against objectively weak password strings by relying on knowledge shared by the communicating parties and providing for multi-factor authentication and can provide forward secrecy when fresh random values are used each time the protocol is operated. The encryption provides strong protection without having to dedicate processing power or resources to tokenizing and detokenizing the PII. These problems arise out of the use of computers and the internet because biometric processing and key exchanges cannot exist without the use of computers and the internet. Accordingly, problems relating to authentication between parties communicating over electronic mediums arise out of computers and the internet.

FIG. 1 is a schematic flow diagram of an example method 10 of generating an BESAI token, according to an example arrangement. The method 10 enables the signing party to "sign" an electronic agreement (e.g., a contract, document, communication, etc.) by binding and encrypting a record of the electronic agreement with his or her biometric information using an authenticated encryption mechanism. The signing party provides a biometric sample, a record, and a signing party identifier. The BESAI processing system extracts the secret knowledge factor from the biometric sample and generates the BESAI token.

Figure 2:
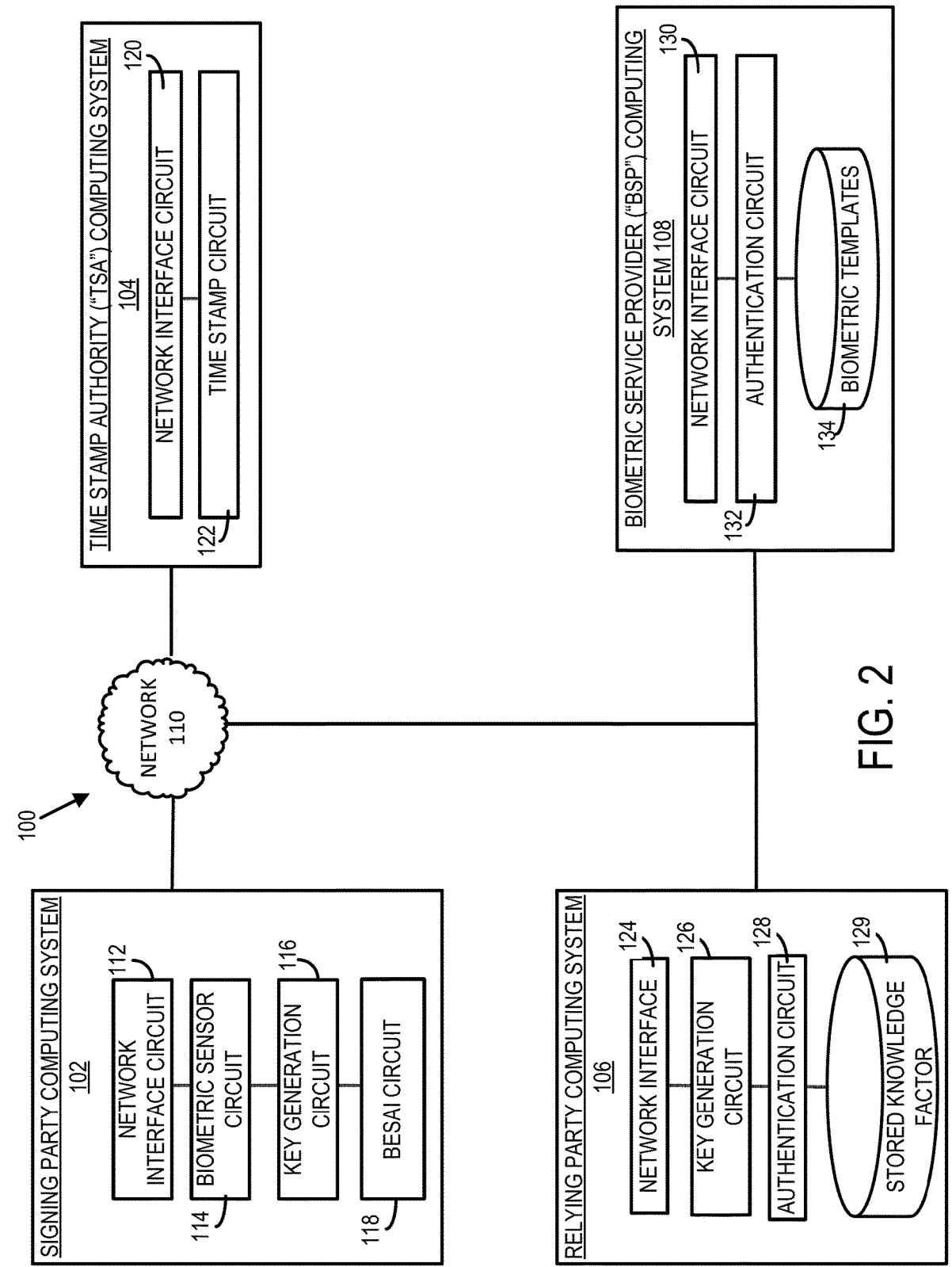
FIG. 2 is a schematic diagram of a BESAI token processing system, according to an arrangement.

In some arrangements, the signing party enrolls a biometric reference template with a relying party (e.g., associated with the relying party computing system 106 of FIG. 2) and/or a biometric service provide ("BSP") (e.g., associated with the BSP computing system 108), at 20. In various arrangements, the signing party enrolls the biometric reference template as a pre-requisite to generating a BESAI token. Enrollment is completed when the generated biometric reference template is associated with a signing party identifier unique to the signing party. The enrollment process may include the user (e.g., signing party) providing a plurality of biometric samples. In some arrangements, the initial biometric sample is taken at the relying party's location using a biometric sensor, for example on a cell phone, a laptop, a tablet, a computer, a voice recognition device or any other device using voice recognition software (e.g., a voice recognition artificial intelligence such as SIRI, ALEXA or GOOGLE Assistant).

In other arrangements, the user must have their plurality of initial biometric samples taken at an establishment managed by a BSP. However, in other arrangements, the initial biometric sample is taken on the signing party's computing system, for example on a mobile device. The biometric sample may include, for example, a finger print, a retina scan, a voice profile, etc. Additionally, the signing party establishes a secret knowledge factor with a relying party or the BSP. The secret knowledge factor is the "something-you-know" (e.g., a numeric pin, an alphanumeric password, etc.) used to generate the symmetric key by the signing party to encrypt the content in the BESAI token (and subsequently used by a relying party to decrypt content in the BESAI token). For example, the secret knowledge factor could be a password string of "password 123." In some arrangements, the secret knowledge factor is shared using an encrypted, secure connection via a network. The biometric reference template and the signing party secret factor (stored as a "stored knowledge factor" herein) are stored with the signing party identifier for future authentication instances.

A secret knowledge factor is received by a computing system, at 22. For example, the biometric sample is received and captured by the signing party computing system 102 associated with the signing party. The secret knowledge factor includes knowledge and matching factors, and may include, for example a password provided during enrollment of the signing party with the relying party or the BSP. In particular arrangements, the signing party may receive the electronic agreement on the signing party computing system 102 and the secret knowledge factor allows the signing party to access the agreement. In particular arrangements, the secret knowledge factor may be received via a plain text message (e.g., a numeric or alphanumeric password) entered by the signing party.

In some arrangements, a first biometric sample is received from the signing party by the computing system, at 24. The first biometric sample includes knowledge and matching factors. For example, the signing party's biometric sample may be a biometric access phrase, for example a voice sample of the signing party speaking a biometric access phrase of "My password is password 123." In this instance, the knowledge factor would be the extracted "password 123," which matches the signing party's secret knowledge factor, and the matching factor would be the voice sample that matches the voice signature in the signing party's biometric template. In other arrangements, the first biometric sample may include an authenticating biometric sample, such as, for example, a thumbprint, a facial recognition knowledge factor, an retina recognition knowledge factor, a speech pattern, a DNA sample, a foot movement pattern, a hand gesture or any other suitable biometric sample or a combination thereof. The sample may be captured using a biometric sensor or similar device (e.g., using a microphone on a mobile computing device). In some arrangements, the captured biometric sample is first transmitted to a BSP (e.g., the BSP computing system 108) to be processed into biometric data. In some arrangements, the first biometric sample is part of a multifactor authentication protocol in which the knowledge factor (e.g., the password) is the first authentication factor and the first biometric sample is the second authentication factor. In other arrangements, the first biometric sample may be used as the only authentication factor including the secret knowledge factor.

A biometric sample is received from the signing party, at 26. In some arrangements in which the first biometric sample is received, the biometric sample may include a second biometric sample different from the first biometric sample. The biometric sample includes an approval sample and/or an intent sample. The approval sample includes a first biometric representation of the signing party's approval of terms of an electronic agreement, and the intent sample includes a second biometric representation of confirmation of the signing party's intent to sign the electronic agreement. In particular arrangements, the approval sample and the intent sample may include a voice sample that includes a confirming phrase. For example, the approval sample may include a first confirming phrase (e.g., "I agree to the terms of the agreement") and the intent sample may include a second confirming phrase (e.g., "I intend to sign the agreement").

The approval sample and the intent sample may be recorded using a speaker device (e.g., associated with the signing party computing system 102) or a cloud based voice recognition service (e.g., SIRI, ALEXA, or GOOGLE Assistant). The signing party may enter the biometric sample in response to receiving one or more queries on the signing party computing system 102 (e.g., "Please repeat the following: I agree to the terms of the agreement," and "Please repeat the following: I intend to sign the agreement"). In some arrangements, after capturing the biometric sample, the voice recognition service or tool may verify if the signing party spoke the words clearly and correctly. This may allow the signing party computing system 102 to recapture the biometric sample if the approval sample and/or the intent sample were not recorded correctly in a previous try. In various arrangements, a visual recording may also be performed simultaneously to confirm the signing party's approval of the terms of the agreement and intent to sign the agreement. In still other arrangements, the approval sample and/or the intent sample may include any other biometric sample, for example, a facial gesture (e.g., nod or moving head sideways), a hand gesture (e.g., sign language), a thumbprint, DNA, eye movement, foot movement pattern and/or a combination thereof.

In particular arrangements, the second biometric sample may also serve as an authentication factor such that the first biometric sample is not used. For example, the voice recognition tool may also use the voice signature of the signing party included in the approval sample and/or the intent sample for comparing with the biometric template stored with the relying party and/or the BSP to authenticate the signing party. The authentication via the second biometric sample may also be used to verify the identity of the signing party to confirm that the approval sample and the intent sample were indeed recorded by the signing party.

The secret knowledge factor associated with the signing party is extracted from the biometric sample, at 28. For example, the secret knowledge factor may be extracted from the first biometric sample and/or the second biometric sample. If the captured first biometric sample was a finger print with finger gestures, the finger gestures would be parsed out to determine the "gestured" (e.g., a pattern, touching the sensor in particular locations, etc.) movements to extract the secret knowledge factor. In some arrangements, the BESAI processing system may require the signing party to provide the secret knowledge factor manually (e.g., by typing in the passcode to a computing device keyboard) in addition to providing it in the biometric sample.

An encryption key is generated using the secret knowledge factor as an input to a password authenticated key exchange protocol, at 30. For example, the encryption key can include a symmetric encryption key generated using the D-H algorithm or other password authenticated key exchange ("PAKE") protocols. In some arrangements, the PAKE protocol is ITU-T Recommendation X.1035 (2007). The PAKE used may comply with the standards outlined in the ISO/IEC 11770-4 standard. As previously discussed, both parties must have pre-established the shared secret that will be used by both parties to generate the same keys.

The biometric sample and, optionally a record of the electronic agreement are encrypted using the generated symmetric key, at 32. The BESAI token, including the encrypted biometric sample and a signing party identifier in clear text associated therewith, and the record of the electronic agreement is generated, at 34. The process includes the use of an encryption algorithm associated with the authenticated encryption mechanism. The input for the encryption algorithm of the BESAI token may include plaintext content (including at least the biometric sample and record) and the secret knowledge factor (either manually entered, extracted from the biometric sample, or both). In some arrangements in which the first biometric sample is also used, the first biometric sample may also be encrypted with the encryption key, such that the BESAI token also includes the first biometric sample.

The BESAI token can be verified using a decryption key generated using a stored knowledge factor as an input to the password authenticated key exchange protocol. The stored knowledge factor is retrieved based on the signing party identifier. Furthermore, the approval of the terms of the electronic agreement and confirmation of intent to sign the electronic agreement by the signing party can be verified by decrypting the biometric sample. Moreover, the identity of the signing party can be authenticated by decrypting the biometric sample from the BESAI token using the decryption key and matching the decrypted biometric sample with a biometric reference template associated with the signing party identifier. In various arrangements, the computing system may also encrypt a record of the electronic agreement with the symmetric key so as to cryptographically bind the record with the biometric sample such that the BESAI token further includes the encrypted record of the electronic agreement. The signing party's identity can be authenticated by matching an extracted knowledge factor from the BESAI token with the stored knowledge factor.

In some arrangements, the first biometric sample may include plaintext content to provide the "something-you-are" authentication factor and the record to provide the transaction or interaction information. In some arrangements, additional attributes can be included in the input. For example, in one implementation, a signing party may want to withdraw funds from an ATM. To validate the withdrawal, the BESAI token can include signed attributes, such as a financial institution identifier, an account number, a customer account number, a BSP identifier, and an ATM-generated time stamp.

In some arrangements, the plaintext content may include a hash of the record and/or a hash of the biometric sample in place of the actual record and biometric sample. For example, the computing system may generate a hash of a record of the electronic agreement and encrypt the hash of the record with the biometric sample (e.g., the second biometric sample, and may also include the first biometric sample). The BESAI token may be generated using only a hash of the record and may further include the encrypted hash of the record. In some arrangements, the record is appended to or included with the biometric sample to further associate the record and the biometric sample. For example, the plaintext could include a loan agreement and the signer's biometric sample, thereby providing greater assurance to a relying party on the identity of the signing party and providing an indication of acceptance of the record than traditional digital signature methods alone.

In some arrangements, the computing system may store the record of the agreement at a storage location identified by a storage location identifier. For example, the storage location identifier may include a Uniform Resource Identifier ("URI") to a uniform resource locater where the record is stored, which may include plain text content including a string of characters used to identify a source. Such identification enables interaction with representations of the resource over a network, such as the internet of things, using specific protocols. Schemes specifying a concrete syntax and associated protocols define each URI. The most common form of URI is a Uniform Resource Locator ("URL"). The computing system may encrypt the URI with the encryption key so as to cryptographically bind the storage location identifier with each of the hash of the record and the biometric sample such that the BESAI token includes the encrypted storage location identifier.

The URI can be used in the BESAI processing system in place of the record that is being signed. For example, a URI to the document that was being signed and a hash of that document could be used in the plaintext content (in addition to the biometric sample). This use would allow a relying party to use the decrypted URI to identify the record location, and the hash of the record would ensure that the record at the record location has not been altered (e.g., if the record at the record location is unaltered, it will generate the same hash as found in the BESAI token). Therefore, if the document at the URI were to change, even by one character, an authentication system would be able to detect that it's not the document the signing party intended to sign. Moreover, in some arrangements, the URI may include an evidence event log that records details of the electronic agreement to prevent a later attempt at repudiation of the electronic agreement.

While not shown, in some arrangements, a time stamp token ("TST") may be requested from a time stamp authority ("TSA"), for example the TSA computing system 104 of FIG. 2. In some arrangements, the TST is requested by generating a hash of the record and the biometric sample by the computing system, which is used as an input to a trusted time stamp process. For example, in some arrangements, the hash is transmitted to the TSA, which cryptographically binds the hash to a time stamp to generate the TST. The computing system may retrieve the TST including the hash cryptographically bound to the time stamp. The TST can be subsequently included in the encryption algorithm as the plaintext along with the record and biometric sample provided with the BESAI token or used in place of the record and biometric sample in the encryption algorithm. The time stamp token may be subsequently validated by verifying that the time stamp token was generated using the hash. In some arrangements, the TST may be cryptographically bound to the biometric sample.

In some arrangements, the BESAI token is structured using a NamedKeyEncryptedData cryptographic message syntax type, wherein the NamedKeyEncryptedData includes a keyName value that is representative of the signing party identifier. Expanding further, a non-trusted time stamp (e.g., local to the signing party computing system 102) may be included. As the TST provided by the TSA is already cryptographically protected as a signed object, in some arrangements, it is in the unprotectedAttrs component of the BESAI token that is generated using the NamedKeyEncryptedData message type of the X9.73 CMS-ASN.1 and XML standard.

The BESAI token may be structured using CMS type NamedKeyEncryptedData, which is a cryptographic message syntax defined in the X9.73 CMS-ASN.1 and XML standard. NamedKeyEncryptedData allows for the use of the "keyName" component to provide the additional signing party identifier information within the BESAI token. In some arrangements, the keyName component of type NamedKeyEncryptedData is defined as a value of Abstract Syntax Notation One ("ASN.1") type OCTET STRING, which is an opaque string that could contain any type or format of data. However, when a keyName value is used to generate the BESAI token, the symmetric key is identified indirectly using an account identifier or login of the signing party. The keyName component is any public value since the actual "key name" (e.g., what is used to generate the symmetric key) is the secret knowledge factor (e.g., a pass phrase or password that must not be revealed to an attacker). The key name could be a string that represents an account number or login with the relying party, such as, for example, "John J. Smith." If this key name needed to be globally unique, for example for use in an ecommerce setting, it could be represented as a fully qualified account name, such as "http://www.relying party.com/JohnJSmith." This value would provide sufficient information to allow an authentication system of the relying party to determine the value of the signing party's previously stored password. That value could be used in a D-H agreement scheme to derive the symmetric key needed to recover the plain text value from the encrypted cipher text in an encryptedContentInfo component of the NamedKeyEncryptedData message an example of which is as follows:

NamedKeyEncryptedData::=SEQUENCE {
version CMSVersion,
keyName, [0] OCTET STRING OPTIONAL, encryptedContentInfo EncryptedContentInfo, unprotectedAttrs [1] UnprotectedAttributes OPTIONAL
}

As will be appreciated, the BESAI token generated using the NamedKeyEncryptedData message includes a plaintext to be encrypted of a biometric sample, an optional time and date string, and an optional challenge-response.

Furthermore, the capturing of the approval sample and the intent sample from the signing party may also be achieved using a NamedKeyEncryptedData message, an example of which is as follows:
AgreeAndIntendToESIGN::=SEQUENCE {
agreeToTerms Exchange,
intendToSign Exchange
}
Exchange::=SEQUENCE {
responseType EXCHANGE.&id({Exchanges}),
userResponse
EXCHANGE.&Type({Exchanges}{@responseType})
}

As will be appreciated, the BESAI token generated using the NamedKeyEncryptedData message includes a plaintext to be encrypted of the approval sample confirming the signing party's approval of the terms of the agreement and the intent sample confirming the signing party's intent to sign the agreement.

The generated BESAI token may be transmitted to a relying party (e.g., the relying party computing system 106) along with a signing party identifier, at 36. In some arrangements, the signing party identifier is included within the BESAI token. The signing party identifier represents an account login, user name, or similar identifier recognizable by the relying party to be associated with the secret knowledge factor. The signing party identifier allows the relying party to retrieve the previously enrolled signing party secret as the stored knowledge factor.

While not shown in FIG. 1, in some arrangements, the BESAI token may further include a challenge question, for example included in the plain text used to generate the BESAI token at operation 34. The challenge question may require a response answer from the relying party. The computing system (e.g., the signing party computing system 102) may receive a challenge response, including a response answer from the relying party to the challenge question, which may be encrypted using a response key generated using the stored secret knowledge factor as an input to the password authenticated key exchange protocol. If the relying party responds appropriately, then the signing party may mutually authenticate the relying party. For example, the computing system (e.g., the signing party computing system 102) may mutually authenticate the relying party and the signing party by decrypting the challenge response using a response decryption key generated using the secret knowledge factor as an input to the password authenticated key exchange protocol to retrieve the response answer. The computing system may then verify the response answer. The challenge question may also provide protection against man-in-the-middle or phishing attacks because an unauthorized source would lack the credentials and knowledge to respond appropriately to the challenge question.

In some arrangements, the BESAI token may include a possession identifier. In some arrangements, the possession identifier is included within the generated BESAI token and protected by encryption. The possession object identifiers are associated with the signing party identifier to confirm a "something-you-have." The possession object identifiers, (i.e., the "something-you-have factor") could be a key fob, a MAC address for a computing device, a coordinate location pairing, etc. In order to be authenticated, the signing party associated with the signing party identifier would have to possess the object identifier when providing the biometric sample. For example, the BESAI token would fail to generate (or fail a validation attempt by a relying party) if the provided biometric sample was extracted from a biometric sensor with the physical address "ABC" but the signing party identifier only enrolled a possession object identifier for biometric samples to be submitted from a biometric sensor with the physical address of "EFG." In some arrangements, the signing party has a fob that is the possession object identifier associated with the signing party identifier. While the biometric sample is captured, the signing party provides the value contained in the fob (e.g., the "something-you-have" factor), the value related to the biometric sample that includes a biometric message (e.g., the "something-you-know" factor), and biometric characteristics (e.g., the "something-you-are" factor).

In some arrangements, the computing system may receive a rescind message indicating that the signing party rescinds the agreement. For example, the signing party may refuse to honor the agreement after providing the electronic signature and recording the biometric sample including the approval sample and the intent sample. The signing party may enter the rescind message in the signing party computing system 102 by, for example sending a text or email to the relying party computing system (e.g., the relying party computing system 106), or making a phone call to the relying party. In such instances, the computing system may extract the biometric sample associated with the electronic agreement (e.g., associated with the hash of electronic agreement and the biometric sample). The computing system may communicate the extracted biometric sample to the signing party (e.g., show the biometric sample to the signing party on a display associated with the computing system, or play a recording of the biometric sample) which provides evidence that the signing party approved the terms of the electronic agreement and confirmed intent to sign the electronic agreement. For example, the approval sample and the intent sample may include voice recordings of the signing party confirming that the signing party approved the terms of the agreement and confirmed intent to sign the agreement. The BESAI token thereby provides evidence of the signing party's agreement to the terms and intent to sign the agreement bound as an electronic record with the agreement. The bound biometric sample may be extracted and presented to the signing party or court of law at a later date as evidence of the signing party's confirmation of the terms of the agreement and intention to sign the agreement.

As will be appreciated, the method 10 is transparent to the signing party and is easy to use. From the signing party's point of view, the signing party has to provide only a secret knowledge factor or first biometric sample containing the signing party secret knowledge factor and provide a biometric sample containing the approval sample and the intent sample to generate the BESAI token. For example, the signing party receives a loan agreement from a financial institution at which the signing party is an account holder and at which the signing party has previously enrolled a biometric voice profile including the secret knowledge factor. The signing party interacts with the BESAI processing system (e.g., accesses an application on a computing device) and identifies the loan agreement as the document. The signing party enters the secret knowledge factor and/or speaks the secret knowledge factor, for example "My password is password123," into a biometric sensor in communication with the BESAI processing system. Furthermore, after reading the loan agreement, the signing party is prompted to enter the approval sample and the intent sample using the same biometric sensor, thereby affirming the signing party's confirmation of the terms of the loan agreement and confirming the signing party's intent to sign the loan agreement, respectively. The BESAI processing system captures the biometric sample, extracts the secret knowledge factor from the entered knowledge factor and/or the first biometric sample, generates the symmetric key, encrypts the record of the electronic agreement, the biometric sample (i.e., the second biometric sample), and optionally the first biometric sample, and generates the BESAI token. Accordingly, to generate the BESAI token, the signing party need only remember the password/passphrase.

FIG. 2 is schematic diagram of an BESAI token processing system 100 for generating and validating BESAI tokens that includes a biometric sample including a signing party's approval of terms of, and confirmation of intent to sign an electronic agreement, according to an example arrangement. The BESAI token processing system 100 includes a signing party computing system 102, a TSA computing system 104, a relying party computing system 106, and a BSP computing system 108. In some arrangements, the BSP computing system 108 may be included in the relying party computing system 106. Each of the signing party computing system 102, the TSA computing system 104, the relying party computing system 106, and the BSP computing system 108 is in operative communication with the others via a network 110.

The network 110 is any suitable Local Area Network (LAN) or Wide Area Network (WAN). For example, the network 110 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The network 110 is structured to permit the exchange of data, values, instructions, messages, and the like between the signing party computing system 102, the TSA computing system 104, the relying party computing system 106 and/or the BSP computing system 108.

The mechanisms allow for the generation and verification of the identity of a signer of an electronic agreement via a secret knowledge factor and/or a first biometric sample. Furthermore, the BESAI token processing system 100 allows for the recording and association of a second biometric sample with the electronic agreement which includes an approval sample comprising a first biometric representation of the signing party's approval of terms of an electronic agreement, and an intent sample comprising a second biometric representation of confirmation of the signing party's intent to sign the electronic agreement.

Specifically, the BESAI token processing system 100 makes it possible for the identity of the signer to be verified by a relying party (e.g., merchant, financial institution, service provider, etc.) by encrypting a biometric sample, additional content, and attributes that facilitate the verification of the message signer (e.g., signing party, user, customer, etc.). Moreover, the BESAI token processing system 100 also provides the relying party with evidence in the form of the second biometric sample, which may be used to prove that the signing party indeed approved the terms of the agreement and intended to sign the electronic agreement in the instance the signing party rescinds the agreement.

Generally, customers may use the BESAI token processing system 100 to extract knowledge from a biometric sensor and provide varying levels of authentication data (i.e., the secret knowledge factor and/or the first biometric sample) and evidence data (i.e., the second biometric sample) to a relying party. The BESAI token processing system 100 allows for a biometric-based protocol for PAK exchange to be used wherein the system relies on a knowledge factor shared by the communicating parties that is extracted from data collected by biometric sensors. BESAI uses similar processing as international standards but allows the use of more general, pre-shared "something-you-know" biometric knowledge in both client-side and server-side authentication.

The signing party computing system 102 includes a network interface circuit 112, a biometric sensor circuit 114, a key generation circuit 116, and an BESAI circuit 118. The network interface circuit 112 is structured to facilitate operative communication between the signing party computing system 102 and other systems and devices over the network 110. The signing party computing system 102 may include smartphones, tablet computing systems, laptop computing systems, desktop computing systems, PDAs, smart watches, smart glasses, tablets, etc.

The biometric sensor circuit 114 is structured to capture biometric data. For example, the biometric sensor circuit 114 may include a sensor or may be operatively coupled to a sensor structured to read a fingerprint, voice print, or other biometric marker. Generally, the biometric sensor circuit 114 is any technology type that supports the capture of biometric data. In particular arrangements, the biometric sensor circuit 114 may utilize or may be a microphone included in the signing party computing system 102 (e.g., the microphone of the signing party's mobile phone, laptop, computer, tablet, etc.) and a voice recognition tool (e.g., SIRI, ALEXA, GOOGLE Assistant, etc.) configured to capture the first biometric sample including the secret knowledge factor and the second biometric sample including the approval sample and the intent sample.

In particular arrangements, the biometric sensor circuit 114 includes or is operatively connected to a floor pad operably connected to the signing party computing system 102 by collecting both the walking and stepping patterns from the walking samples for biometric matching using a two-dimensional biometric sensor grid. The order and identities of tiles encountered as participants traverse the grid could convey signing party knowledge through a stepping pattern. A series of identifiers mapped to user-selected tiles forming a memorized stepping pattern could serve as the customer's "something-you-know" factor. In still other arrangements, the biometric sensor circuit 114 may include or may be operatively connected to a visual sensor (e.g., a camera) configured to capture hand gestures (e.g., American Sign Language), head movements, or eye movements as the first and/or second biometric sample. In some arrangements, the raw biometric data captured by the biometric sensor circuit 114 is processed by a BSP to generate a biometric reference template. In some arrangements, a plurality of biometric samples captured from an individual are processed to create the biometric reference template.

The key generation circuit 116 is structured to derive a cryptographic symmetric key using an agreed-upon encryption algorithm (e.g., encryption protocol), for example the D-H protocol, other commutative encryption algorithms, etc. The key generation circuit 116 derives a cryptographic key based on the secret knowledge factor. Both the signing party and the relying party must have pre-established the protocol operation, and have shared knowledge of the password both parties will use with the commutative encryption algorithm protocol to generate the encryption and decryption keys used to encrypt and decrypt data in the BESAI token. In some arrangements, the key generation circuit 116 extracts the signing party knowledge factor from the biometric sample captured by the biometric sensor circuit 114. In other arrangements, the signing party knowledge factor is provided by the BESAI circuit 118.

The BESAI circuit 118 is structured to generate a BESAI token by extracting the signing party knowledge factor from the secret knowledge factor and/or the biometric sample (e.g., the first biometric sample and/or the second biometric sample) and encrypting a record and the biometric sample (e.g., the second biometric sample and optionally, the first biometric sample) with the symmetric key generated by the key generation circuit 116. In some arrangements, the BESAI token further includes an identifier of a registered object (e.g., unique RFID, a telebiometric authentication identifier, etc.), allowing an additional "something-you-have" authentication layer. An example method of generating a BESAI token is described in greater detail above in method 10 of FIG. 1.

The TSA computing system 104 includes a network interface circuit 120 and a time stamp circuit 122. The TSA computing system 104 is managed by any trusted time authority that can provide a TST for a piece of information. The trusted time authority can be one that complies with the X9.95 standard, or those defined in similar standards by ISO/IEC/IETF, and satisfies legal and regulatory requirements. In some arrangements, the TSA computing system 104 may be contained in, and controlled by, the TSA computing system 104 or the BSP computing system 108. The network interface circuit 120 is structured to facilitate operative communication between the TSA computing system 104 and the signing party computing system 102 over the network 110. The time stamp circuit 122 is structured to negotiate a trusted TST, which includes receiving a hash of a piece of information and generating a trusted TST for the information for future verification. In some arrangements, the TST is generated inter-device (e.g., capturing the system time, or mobile phone time), and the TST is included in the plaintext that is encrypted in the BESAI token. In other arrangements, the TST is included along with the BESAI token as an unencrypted attribute.

The BSP computing system 108 includes a network interface circuit 130, an authentication circuit 132, and a biometric reference template database 134. The network interface circuit 130 is structured to facilitate operative communication between the BSP computing system 108 and other systems and devices over the network 110. Generally, the BSP computing system 108 stores biometric reference templates in the biometric reference template database 134 for signing parties and handles biometric matching requests from relying parties. In some arrangements, before using the BESAI token processing system 100, the signing party must have enrolled with the BSP and created a biometric reference template. In other arrangements, the biometric reference template may be extracted in real time, for example from either one of the approval sample and/or the intent sample included in the second biometric sample. In particular arrangements, the BSP computing system 108 may be included in the relying party computing system 106. In still other arrangements, the BESAI system may authenticate the identity of the signing party using single or multi-factor non-biometric samples, for example an alphanumeric password comprising the secret knowledge factor and an alphanumeric input. In such instances, the BSP computing system 108 may be excluded from the BESAI token processing system 100.

In some arrangements, the first biometric sample may only be transmitted by an employee of the BSP entering the data into a computing system (e.g., an employee terminal connected to the server of the BSP) during a person-to-person interaction. For example, the customer may walk into a branch location of the BSP and initiate the enrollment process via interaction with a teller. In other arrangements, the BESAI token processing system 100 may create a biometric reference template from the signing party provided biometric sample so that the signing party can be enrolled in a biometric reference template database 134 for subsequent biometric authentication or identification.

The biometric reference template database 134 includes a plurality of signing party identifiers and corresponding biometric reference templates that are a byproduct of customers enrolling in the biometric service. The signing party identifier can be, for example, a signing party name, email address, phone number, or the actual name of the customer. The signing party identifier may be stored in the attributes or fields of the BESAI token.

The authentication circuit 132 is structured to receive a biometric sample and an authentication request from the relying party computing system 106 over the network 110 and compare the received sample to a stored reference template in the biometric reference template database 134. The authentication request includes a request for verification and/or identification. If the sample matches the reference template, the authentication circuit 132 transmits a positive authentication value to the relying party computing system 106. In some arrangements, the authentication circuit 132 will provide a negative matching value (e.g., indicator) if there is no matching signing party identifier in the biometric reference template database 134 or if the signing party does not have a biometric reference template for the biometric type of the biometric sample.

The relying party computing system 106 includes a network interface circuit 124, a key generation circuit 126, an authentication circuit 128, and a stored knowledge factor database 129. Generally, the relying party computing system 106 receives a BESAI token from the signing party computing system 102 and verifies the identity of the message signer. With the received BESAI token, the relying party computing system 106 is also able to verify data integrity and origin authenticity of the content within the BESAI token and the BESAI token as a whole. Specifically, if the biometric sample and biometric reference template produce a positive match value and the digital signature is verified, the relying party can trust the data integrity and origin authentication. Origin authenticity is achieved if the same symmetric key associated with the secret knowledge factor is generated and matches the knowledge factor extracted from the biometric sample. The network interface circuit 124 is structured to facilitate operative communication between the relying party computing system 106 and other systems and devices over the network 110.

The key generation circuit 126 is structured to derive a cryptographic key using an agreed-upon encryption algorithm (or encryption protocol) (e.g., the D-H protocol, other commutative encryption algorithms, etc.). The key generation circuit 126 derives a decryption key based on the stored knowledge factor. Upon receipt of the BESAI token, the relying party computing system 106 extracts a signing party identifier associated with a stored knowledge factor in the stored knowledge factor database 129. The key generation circuit 126 retrieves the stored knowledge factor from the stored knowledge factor database 129 and uses it to generate the symmetric key and decrypt the message. For example, upon receiving the signing party identifier of "John Smith" (e.g., John Smith's username, email address, customer number, Social Security Number, driver's license number, etc.), the key generation circuit 126 will look for John Smith's account in the stored knowledge factor database 129 and retrieve the stored knowledge factor.

The authentication circuit 128 is structured to facilitate the authentication of the biometric sample in a BESAI token with a biometric reference template stored on the BSP computing system 108 or otherwise on the relying party computing system 106. For example, upon receiving an BESAI token, the relying party computing system 106 automatically begins verification of the signature, unencrypts an BESAI token, and transfers the captured biometric sample to the BSP computing system 108 for matching. The biometric sample can be in the form of a simple oblique value (a string of octets) or structured content that contains the biometric data value and any information needed to recover the plaintext, such as the URL address of a biometric service provider or web service, an indication of the specific biometric processing technique that was used, or any other required data or authentication information.

In some arrangements, the attribute of the digital signature message may be cryptographically bound to a hash of the biometric sample. In some arrangements, the decrypted biometric sample may include a biometric access phrase in addition to the secret knowledge factor. For example, the signing party can provide a biometric access phrase of "I use my voice to log on now brown cow," which provides a biometric sample that includes a biometric access phrase ("I use my voice to log on") and a secret knowledge factor ("now brown cow"). The authentication circuit 128 may be structured to parse the biometric access phrase and the secret knowledge factor. In some arrangements, authentication by the authentication circuit 128 is triggered when the biometric access phrase is detected or the BESAI token is decrypted.

Furthermore, the BESAI token also includes the biometric sample (e.g., the second biometric sample) including the approval sample and the intent sample cryptographically bound to the record of the electronic agreement or to a hash thereof. The hash of the biometric sample may be stored in the stored knowledge factor database 129 or the biometric reference template database 134. In some instances, the signing party may rescind the electronic agreement. For example, the signing party may send a rescind message via the signing party computing system 102 to the relying party computing system 106. The authentication circuit 128 may be structured to extract the second biometric sample from the stored knowledge factor database 129, or to request the BSP computing system 108 to extract the second biometric sample, including the approval sample and the intent sample from the biometric reference template database 134 (e.g., decrypting the BESAI token using the cryptographic symmetric key). The second biometric sample may then be communicated to the signing party via the signing party computing system 102 or used in legal proceedings as evidence of the signing party confirming the terms of the electronic agreement, and intent of the signing party to sign the electronic agreement.

Figure 3:
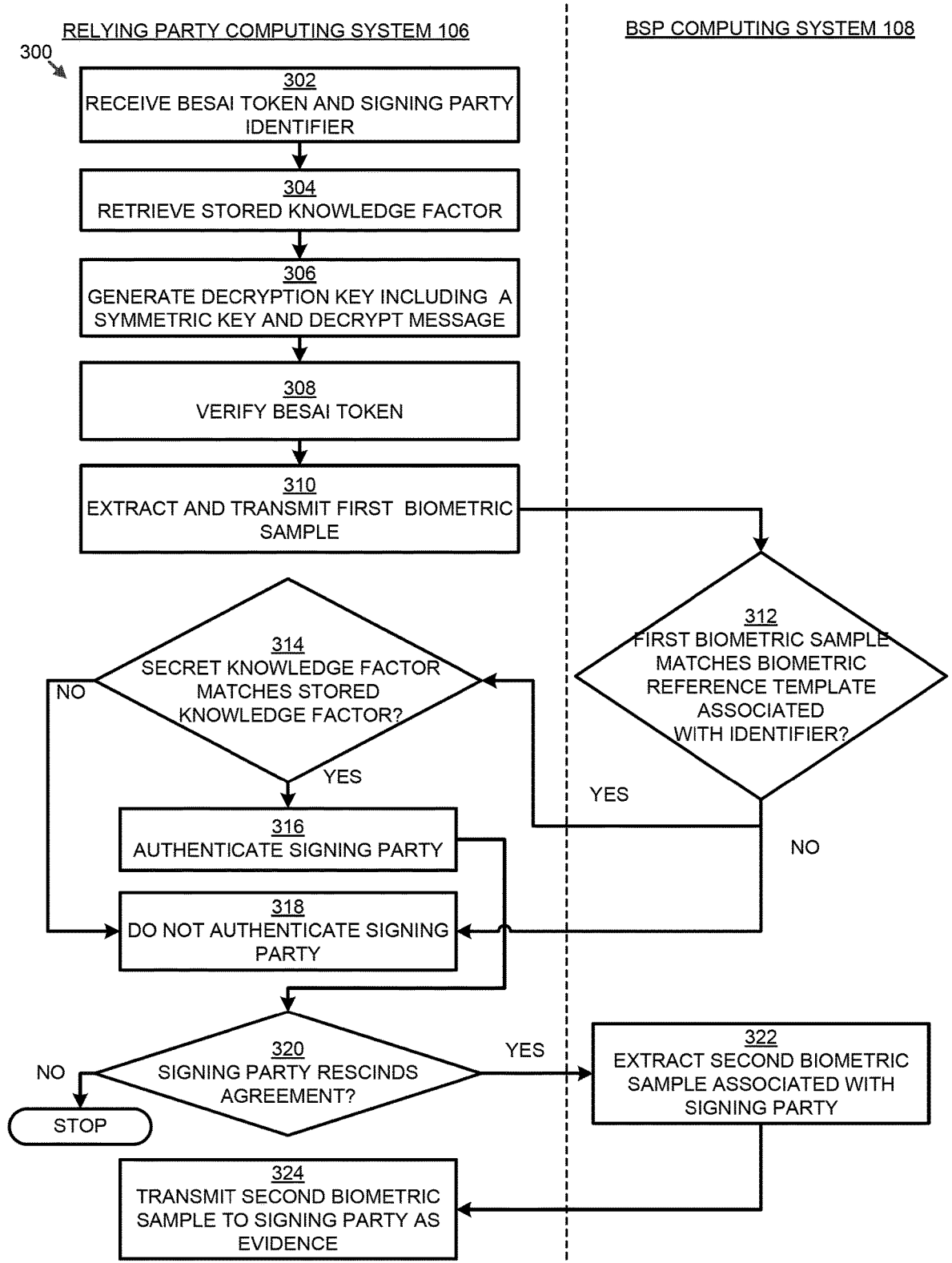
FIG. 3 is a schematic flow diagram illustrating a method of validating a BESAI token and extracting a biometric sample including a signing party's approval of terms of, and intent to sign an electronic agreement, according to an arrangement.

FIG. 3 is a schematic flow diagram illustrating a method of validating an BESAI token and extracting a biometric sample including a signing party's approval to terms of and intent to sign an electronic agreement, according to an arrangement. The method 300 is described in connection with a relying party (e.g., message recipient) and a BSP. According to various arrangements, the relying party is an entity that manages the relying party computing system 106 of FIG. 2, and the BSP is an entity that manages the BSP computing system 108 of FIG. 3. However, the method 300 may be similarly performed by other systems and devices.

The method 300 includes receiving by the relying party computing system 106, an BESAI token from the signing party computing system 102, at 302. The BESAI token includes an encrypted biometric sample received from the signing party, and a signing party identifier associated with a secret knowledge factor. The biometric sample includes at least the second biometric sample comprising the approval sample and the intent sample and may also include the first biometric sample that includes the secret knowledge factor. The BESAI token provides the relying party with all of the information needed to verify the biometric information of a signing party included in the BESAI token.

The BESAI token can subsequently be used to provide two-factor authentication via a "something-you-have" factor in the form of the secret knowledge factor and a "something-you-are" factor in the form of the user's biometric sample. In some arrangements, a relaying party (e.g., middle party, merchant, etc.), which does not require the biometric matching capability but is able to verify the encryption on the BESAI token and trust in some of the BESAI token content, transmits the BESAI token from the signing party to the relying party. The relaying party may transmit the BESAI token to the relying party computing system 106. For example, the relaying party may be a merchant that receives the BESAI token from a credit card holder (e.g., message signer) and transmits the charge information to the relying party (e.g., payment card issuer).

The relying party computing system 106 uses the signing party identifier in the BESAI token to retrieve the stored knowledge factor and, in some arrangements, the stored biometric reference template for the signing party, at 304. In some arrangements, after receiving the message, at 304, the relying party determines if the requesting signing party is registered with the relying party and has a biometric reference template on file with the BSP computing system 108. If the requestor is not registered, the relying party may deny the authentication request. In other arrangements, where no biometric enrollment has occurred, the relying party may require the signing party to provide another biometric sample in person to authenticate the message.

The relying party computing system 106 uses the stored knowledge factor to generate a decryption key including a symmetric key and a decrypt message, at 306, using, for example, the agreed-upon commutative encryption algorithm. The BESAI token is verified using the decryption key, at 308. For example, the relying party computing system 106 may use the secret knowledge factor, the signing party identifier and/or the generated symmetric key to verify or otherwise decrypt the BESAI token via the same encryption algorithm that was used by the signing party to encrypt the extended BESKAE token.

In some arrangements, the BESAI token may further include a challenge question. While not shown, the relying party computing system 106 may also transmit to the signing party, a challenge response comprising a response answer to the challenge question. The response answer may be encrypted using a response key generated using the stored secret knowledge factor as an input to the password authenticated key exchange protocol, for example the cryptographic symmetric key. The relying party computing system 106 mutually authenticates the relying party and the signing party by decrypting the challenge response using a response decryption key generated using the secret knowledge factor as an input to the password authenticated key exchange protocol to retrieve the response answer. The relying party computing system 106 verifies the response answer, for example by comparing the response answer to a stored response answer in the stored knowledge factor database 129.

The relying party computing system 106 extracts the secret knowledge factor and first biometric sample and transmits the first biometric sample including a biometric match request to the BSP computing system 108, at 310. The biometric match request includes the first biometric sample including the secret knowledge factor, and the signing party identifier. In other arrangements, the biometric sample transmitted to the BSP computing system 108 may include the second biometric sample, which includes at least one of the approval sample and the intent sample. For example, a signing party's voice pattern or signature extracted from at least one of the approval sample and the intent sample included in the second biometric sample may be used for matching and authentication. In such arrangements, the BESAI token may not include the first biometric sample.

Alternatively, the request, at 308, could be for an identification. Identification is the process of comparing a submitted biometric sample against some or all enrolled reference templates to determine an individual's identity. Identification is a "one-to-many" comparison that entails the comparison of a match template generated from a newly captured sample with all of the templates in the database. It is most often used to determine whether or not a person has previously enrolled in the system. It should be understood that arrangements described herein are not limited to providing biometric authentication of a message signer and content. Instead, the arrangements described herein may similarly be performed on other types of systems using other types of data.

The BSP computing system 108 determines whether the first biometric sample matches the biometric reference template associated with the signing party identifier, at 312. In other arrangements, in which the second biometric sample is transmitted, the BSP computing system 108 matches a biometric pattern extracted from the approval sample and/or intent sample of the second biometric sample matches the biometric reference template associated with the signing party identifier. The BSP computing system 108 generates and transmits a match value to the relying party computing system 106. For example, the match value is a binary value indicating a match or a non-match. If the result is a non-match, the BSP computing system 108 transmits a non-match message, a negative match value or otherwise a negative authentication value to the relying party computing system 106. The method 300 moves to operation 318, and the relying party computing system 106 does not authenticate the signing party. For example, a relying party computing system 106 may transmit a "user not authenticated" message to the signing party.

The comparison uses a biometric processing algorithm or a biometric matching algorithm. If the sample matches the reference template, then a positive authentication value is transmitted to the relying party computing system 106, at 314. In some arrangements, the BSP computing system 108 may send a Security Assertion Markup Language ("SAML") assertion of the match value. In those arrangements, a time value or time limit may be included with the SAML assertion. In some arrangements, the relying party may authenticate the party if the secret knowledge factor extracted from the biometric sample matches the stored knowledge factor.

The relying party computing system 106 receives the positive match value from the BSP computing system 108, at 314 and may decide to determine if the secret knowledge factor extracted from the biometric sample matches the stored knowledge factor. If the factors match, the relying party authenticates the signing party, at 316. If the factors do not match, the relying party does not authenticate the signing party, at 318. In some arrangements, the relying party may still authenticate the signing party even if the secret knowledge factor extracted from the biometric sample does not match the stored knowledge factor, as the biometric samples matching would be indicative of the proper decryption key being used to decrypt the biometric sample from the BESAI token. In some arrangements, if the biometric knowledge factors match but the secret knowledge factors do not match, the relying party will deny the authentication request and may allow the requestor to resubmit the secret knowledge factor without having to redo the biometric sample. In other arrangements, the relying party does not check the stored knowledge factor from the secret knowledge factor extracted from the biometric sample.

The relying party authenticates the signing party, at 316. In some arrangements that include a TST, the relying party can also verify a TST associated with a BESAI token by completing a "hash check" with the information. This process includes generating a hash of the original data, appending the timestamp given by the TSA, and calculating the hash of the result (e.g., the hash of the original data with the appended time stamp). In some arrangements, the relying party also matches a possession object identifier included with the biometric sample with a stored possession object identifier associated with the signing party's signing party identifier.

The relying party computing system 106 determines if the signing party rescinds the agreement associated with the BESAI token, at 320. If the signing party does not rescind the electronic agreement, the method 300 stops. In other instances, the signing party may rescind the agreement. For example, at a later date after first signing the electronic agreement, the signing party may decide to rescind or back off from the electronic agreement claiming that the signing party did not approve the terms of the agreement and/or did not intend to sign the agreement. In response to determining that the signing party rescinds the agreement, the relying party computing system 106 requests the BSP computing system 108 to extract the second biometric sample including the approval sample and the intent sample. The BSP computing system 108 extracts the second biometric sample associated with the signing party and transmits the second biometric sample to the signing part, at 322.

As described previously, the second biometric sample includes the approval sample comprising a first biometric representation of the signing party's approval of terms of the electronic agreement, and the intent sample comprising a second biometric representation of confirmation of the signing party's intent to sign the electronic agreement. The relying party computing system 106 may transmit the second biometric sample to the signing party as evidence, at 324. In other arrangements, the relying party computing system 106 may use the second biometric as evidence in a court of law or other legal proceedings to prove that the signing party did approve the terms of the agreement and intended to sign the agreement.

Figure 4:
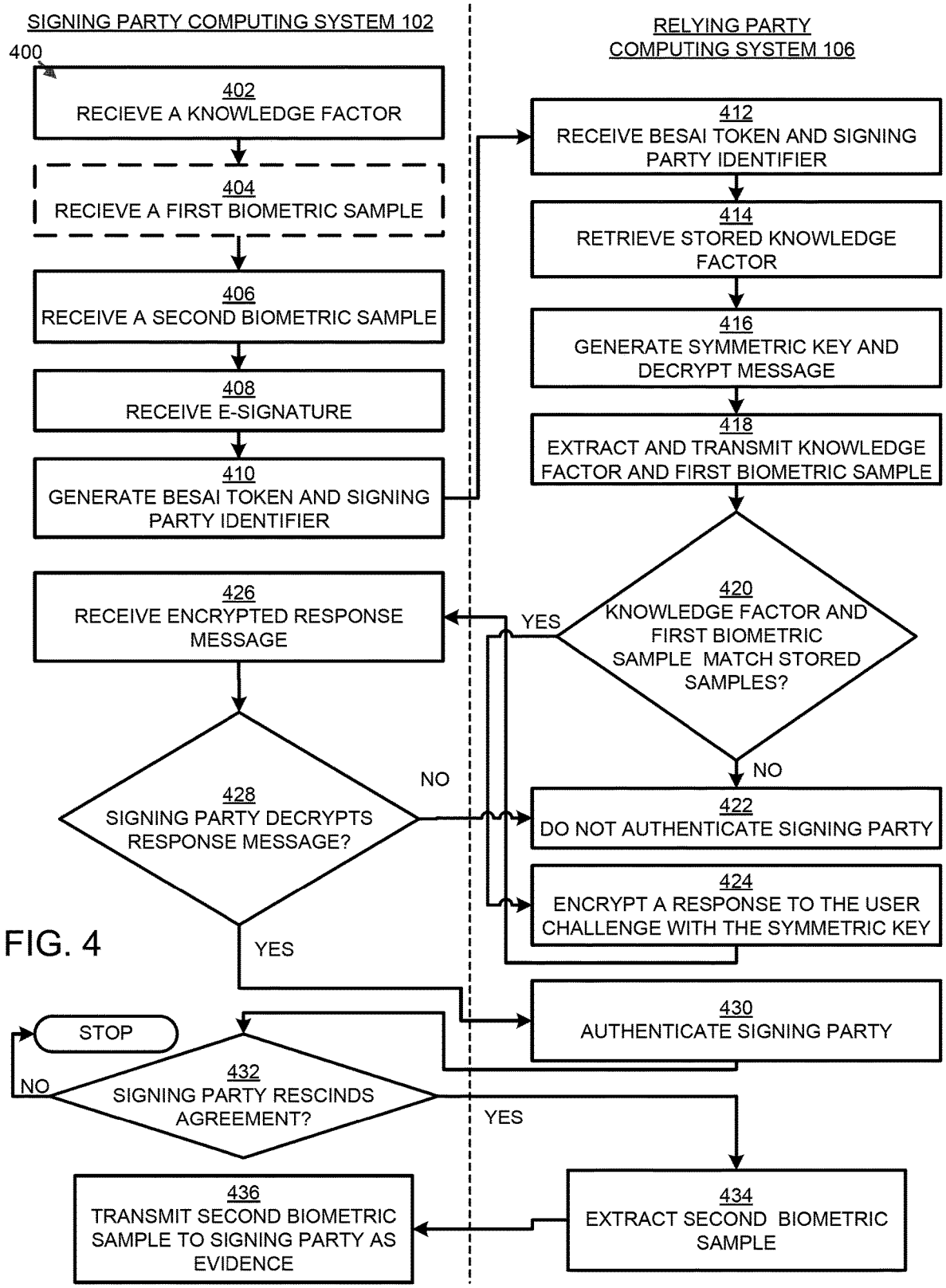
FIG. 4 is a schematic flow diagram of a method of
generating a BESAI token;
validating the identity of a signing party from the BESAI token; and extracting a biometric sample including a signing party's approval of terms of and intent to sign an electronic agreement, according to an arrangement.

FIG. 4 is a schematic flow diagram of a method 400 of generating a BESAI token, validating the identity of a signing party from the BESAI token and extracting a biometric sample including a signing party's approval of the terms of, and intent to sign an electronic agreement, according to an arrangement. The method generally initiates with the signing party computing system 102 receiving a knowledge factor, 402. For example, the signing party may enter a secret knowledge factor (e.g., a password) into the signing party computing system 102 to access or electronically sign an electronic agreement.

In some arrangements, the signing party computing system 102 receives a first biometric sample, at 404. The first biometric sample may include a passphrase, a hand gesture, thumbprint, a head gesture or any other biometric sample, as previously described herein. The signing party computing system 102 receives a second biometric sample, at 406. The second biometric sample includes the evidence biometric sample and includes the approval sample comprising a first biometric representation of the signing party's approval of terms of the electronic agreement, and the intent sample comprising a second biometric representation of confirmation of the signing party's intent to sign the electronic agreement. In particular arrangements, the signing party computing 102 receives an e-signature from the signing party, at 408. The e-signature may include an/s/signature or an electronic representation of the signing party's physical signature. The secret knowledge factor, the first biometric sample and the second biometric sample may be encrypted using an encryption key generated by the signing party computing system 102 using the secret knowledge factor as an input to a password authentication key exchange protocol.

The signing party computing system 102 generates a BESAI token and a signing party identifier in clear text associated therewith, at 410. The BESAI token includes the second biometric sample and in some instances also the first biometric sample. The relying party computing system 106 receives the BESAI token from the signing party computing system 102, at 412. In some arrangements, the BESAI token may include an encrypted hash of a record of the agreement.

The relying party computing system 106 retrieves the stored knowledge factor, at 414. For example, the relying party computing system 106 retrieves the stored knowledge factor from the stored knowledge factor database 129. The relying party computing system 106 generates a symmetric key and decrypt message, at 416. The symmetric key and decrypt message may be generated using the secret knowledge factor. The relying party computing system 106 extracts and transmits the knowledge factor and first biometric sample to the BSP computing system 108, at 418. The relying party computing system 106 determines if the knowledge factor and first biometric sample matches the secret knowledge factor and stored biometric sample, at 420. If the knowledge factor and the first biometric sample do not match the stored knowledge factor and the first biometric sample, the relying party computing system 106 does not authenticate the signing party, at 422.

In response to determining that the knowledge factor and the first biometric sample match, the relying party computing system 106 encrypts a response to a user challenge with the symmetric key, at 424. For example, the BESAI token further includes a challenge question. In response to the challenge question, the relying party computing system 106 encrypts a challenge response comprising a response answer from the relying party to the challenge question. The response answer is encrypted using a response key generated using the stored secret knowledge factor as an input to the password authenticated key exchange protocol. The response answer is mutually authenticated by the signing party computing system 102 and the relying party computing system 106. The signing party receives the encrypted response message, at 426. The signing party decrypts the challenge response using a response decryption key generated using the secret knowledge factor as an input to the password authenticated key exchange protocol to retrieve the response answer. The response answer is verified using the response answer to determine if the signing party computing system 102 decrypts the response message. If the signing party does not decrypt the message, i.e., the response answer is not verified, the relying party does not authenticate the signing party, at 422. In response to determining that the signing party decrypts the challenge response, i.e., the response answer is verified, the relying party computing system 106 authenticates the signing party.

The signing party computing system 102 determines if the signing party rescinds the agreement associated with the BESAI token, at 432. If the signing party does not rescind the electronic agreement, the method 400 stops. In response to determining that the signing party rescinds the agreement, the relying party computing system 106 extracts the second biometric sample, for example requests the BSP computing system 108 to extract the second biometric sample including the approval sample and the intent sample. The BSP computing system 108 extracts the second biometric sample associated with the signing party and transmits the second biometric sample to the signing part, at 434. The relying party computing system 106 may transmit the second biometric sample to the signing party as evidence, at 436. In other arrangements, the relying party computing system 106 may use the second biometric evidence in a court of law or other legal proceedings to prove that the signing party did approve the terms of the agreement and intended to sign the agreement.

Figure 5:
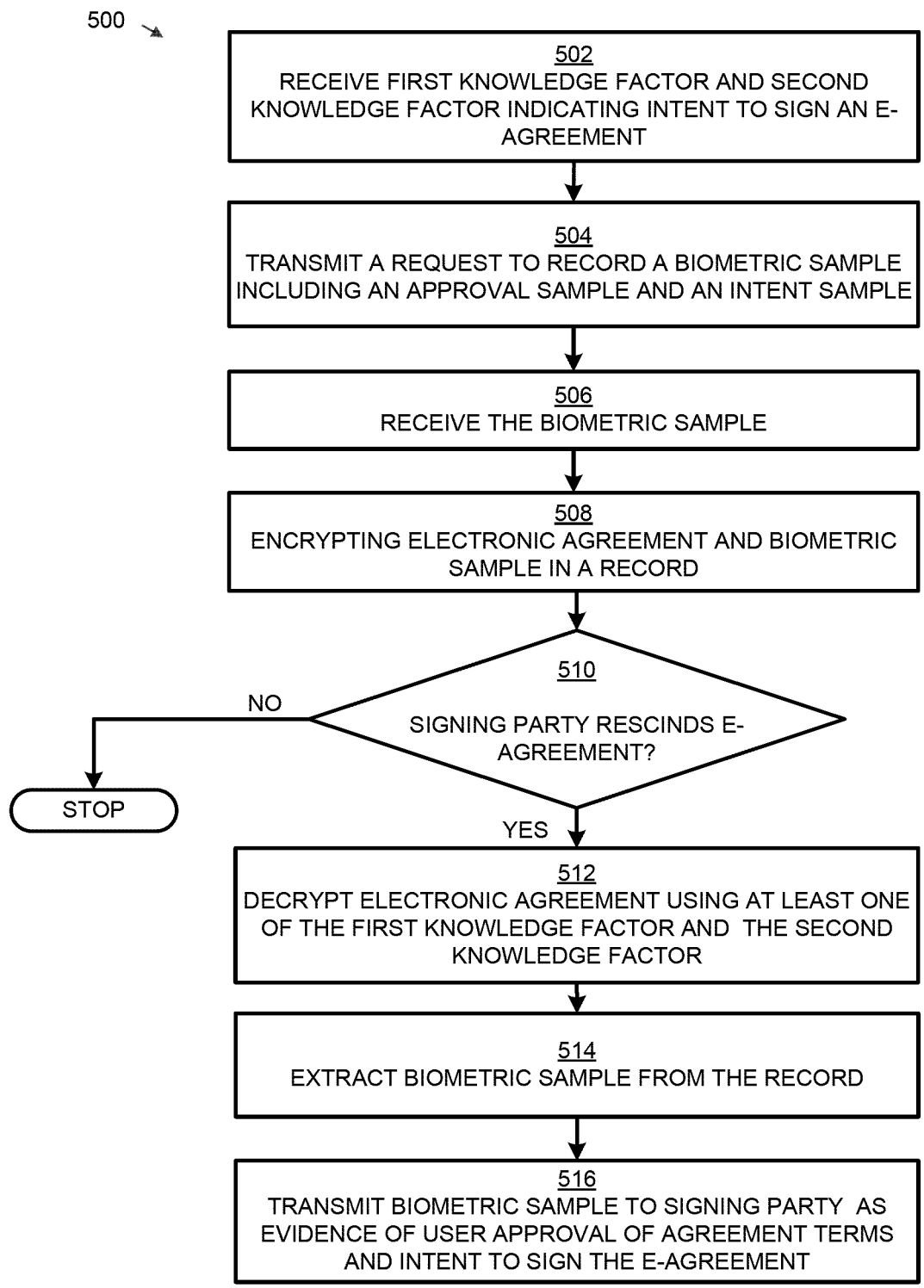
FIG. 5 is a schematic flow diagram illustrating a method of associating a biometric sample with an electronic agreement; and extracting the biometric sample for use as evidence of a signing party's agreement to terms of the electronic agreement, and intention to sign the electronic agreement, according to an arrangement.

FIG. 5 is a schematic flow diagram illustrating a method 500 of associating a biometric sample with an electronic agreement, and extracting the biometric sample for use as evidence of a signing party's agreement to terms of the electronic agreement, and confirmation of intent to sign the electronic agreement, according to an arrangement. The method 500 includes receiving a first knowledge factor and a second knowledge factor from a signing party indicating that the signing party intends to sign the agreement, at 502. For example, the signing party computing system 102 may receive the first knowledge factor and the second knowledge factor from the signing party. The first knowledge factor may include a secret knowledge factor such as a password, and the second knowledge factor may include an alphanumeric code received by the signing party on entering the first knowledge factor, or the first biometric sample (e.g., a thumbprint, a hand gesture, a facial gesture, a retinal signature, or a biometric access phrase).

A request to record a biometric sample confirming the signing party's approval of the terms of the agreement and confirmation of an intent to sign the agreement, in transmitted at 504. For example, the signing party computing system 102 transmits or otherwise displays (e.g., on a display associated with the signing party computing system 102) a request to the signing party to record the biometric sample. As previously described herein, the biometric sample may include the second biometric sample, including the approval sample comprising a first biometric representation of the signing party's approval of terms of the electronic agreement, and the intent sample comprising a second biometric representation of confirmation of the signing party's intent to sign the electronic agreement. In particular arrangements, the biometric sample may include a confirming phrase.

The biometric sample is received, at 506. For example, the signing party computing system 102 requests the signing party to record the approval sample, and the intent sample, as previously described herein. The biometric sample and at least one of the first knowledge factor and the second knowledge factor are encrypted in a record of the electronic agreement, at 508. The record of the electronic agreement may be encrypted using any suitable method. For example, the signing party computing system 102 generates a symmetric key, and uses the symmetric key to encrypt the biometric sample and at least one of the first knowledge factor and the second knowledge factor in the record of the electronic agreement. In particular arrangements, the relying party computing system 106 may generate a BESAI token including the encrypted record of the electronic agreement, as previously described herein.

The method 500 determines if the signing party rescinds the agreement, at 510. For example, the signing party may communicate a message through the signing party computing system 102 to the relying party computing system 106 that the signing party rescinds the agreement, and may contest that the signing party never agreed to the terms of agreement, or never intended to sign the agreement. If the signing part does not rescind the agreement, the method 500 stops. In response to determining that the signing party rescinds the agreement, the record of the electronic agreement is decrypted using at least one of the first knowledge factor and the second knowledge factor, at 512. For example, if the relying party computing system 106 determines that the signing party rescinds the agreement (e.g., receives a rescind message from the signing party computing system 102), the relying party computing system 106 decrypts the record of the electronic agreement, for example using the cryptographic symmetric key. The biometric sample is extracted from the record as evidence of the signing party's approval of the terms and of the signing party's intention to sign the electronic agreement, at 514. For example, the relying party computing system 106 extracts the second biometric sample, including the approval sample and the intent sample, which was encrypted within the record of the electronic record (e.g., using the BESAI key). In some arrangements, the relying party computing system 106 may transmit the biometric sample (e.g., the second biometric sample) to the signing as evidence of the signing party's approving the term of the electronic agreement, and intent to sign the agreement.

The arrangements described herein have been described with reference to drawings. The drawings illustrate certain details of specific arrangements that implement the systems, methods, and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick, camera, microphone, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like. Any foregoing references to blockchains or repositories are intended to include any distributed ledgers. Examples of distributed ledgers include R3CEV Corda, Hyperledger, Ethereum, and the like.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes, and omissions may be made in the design, operating conditions, and arrangement of the arrangements without departing from the scope of the present disclosure as expressed in the appended claims.

What is claimed is:

1. A method, comprising:
    receiving, by a computing system from a signing party, a secret knowledge factor;
    receiving, by the computing system, a biometric sample from the signing party, the biometric sample comprising at least one of:
        an approval sample comprising a first biometric representation of the signing party's approval of terms of an electronic agreement, and
        an intent sample comprising a second biometric representation of confirmation of the signing party's intent to sign the electronic agreement;
    generating, by the computing system, an encryption key using the secret knowledge factor as an input to a password authenticated key exchange protocol;
    encrypting, by the computing system, the biometric sample with the encryption key; and
    generating, by the computing system, a biometric electronic signature agreement and intent ("BESAI") token including the encrypted biometric sample, and a signing party identifier in clear text associated therewith,
    wherein the BESAI token is verified using a decryption key generated using a stored knowledge factor as an input to the password authenticated key exchange protocol, the stored knowledge factor retrieved based on the signing party identifier, the BESAI token being verified by decrypting the BESAI token using the decryption key, and
    wherein the approval of the terms of the electronic agreement and confirmation of intent to sign the electronic agreement by the signing party is verified after decrypting the BESAI token.

2. The method of claim 1, wherein an identity of the signing party is authenticated by decrypting the biometric sample from the BESAI token using the decryption key, and matching the decrypted biometric sample with a biometric reference template associated with the signing party identifier.

3. The method of claim 1, wherein the biometric sample is a second biometric sample, the method further comprising:
    receiving, by the computing system, a first biometric sample from the signing party, the first biometric sample different from the second biometric sample; and
    encrypting, by the computing system, the first biometric sample with the encryption key,
    wherein the BESAI token also includes the first biometric sample, and wherein an identity of the signing party is authenticated by decrypting the encrypted first biometric sample from the BESAI token using the decryption key, and matching the decrypted first biometric sample with a biometric reference template associated with the signing party identifier.

4. The method of claim 3,
    wherein the first biometric sample includes a biometric access phrase.

5. The method of claim 1, further comprising:
    encrypting, by the computing system, a record of the electronic agreement with the encryption key so as to cryptographically bind the record with the biometric sample,
    wherein the BESAI token further includes the encrypted record.

6. The method of claim 1, further comprising:
    generating, by the computing system, a hash of a record of the electronic agreement; and
    encrypting, by the computing system, the hash of the record with the encryption key so as to cryptographically bind the hash of the record with the biometric sample,
    wherein the BESAI token further includes the encrypted hash of the record.

7. The method of claim 6, further comprising:
    storing, by the computing system, the record at a storage location identified by a storage location identifier; and
    encrypting, by the computing system, the storage location identifier with the encryption key so as to cryptographically bind the storage location identifier with each of the hash of the record and the biometric sample,
    wherein the BESAI token further includes the encrypted storage location identifier.

8. The method of claim 7, wherein the storage location identifier includes a uniform resource identifier to a uniform resource locator where the record is stored.

9. The method of claim 1, wherein receiving the secret knowledge factor comprises extracting, by the computing system, the secret knowledge factor from the biometric sample.

10. The method of claim 1, wherein a signing party's identity is authenticated by matching an extracted secret knowledge factor from the BESAI token with the stored knowledge factor.

11. The method of claim 1, wherein the secret knowledge factor is received via a plaintext message entered by the signing party.

12. The method of claim 1, further comprising:
    generating, by the computing system, a hash of a record of the electronic agreement and the biometric sample; and
    retrieving, by the computing system, a time stamp token, the time stamp token including the hash cryptographically bound to a time stamp,
    wherein the time stamp token may be subsequently validated by verifying that the time stamp token was generated using the hash.

13. The method of claim 12, wherein encrypting, by the computing system, the biometric sample further includes cryptographically binding the time stamp token with the biometric sample.

14. The method of claim 1, wherein the BESAI token is structured using a NamedKeyEncryptedData cryptographic message syntax type, wherein the NamedKeyEncryptedData includes a keyName value that is representative of the signing party identifier.

15. The method of claim 1, wherein at least one of the approval sample and the intent sample comprise a confirming phrase.

16. The method of claim 1, wherein the encryption key is a symmetric encryption key generated using a Diffie-Hellman key agreement algorithm.

17. The method of claim 1, wherein the BESAI token further includes a challenge question, the method further comprising:
receiving, by the computing system, a challenge response comprising a response answer from a relying party to the challenge question, the response answer encrypted using a response key generated using the stored secret knowledge factor as an input to the password authenticated key exchange protocol; and
mutually authenticating, by the computing system, the relying party and the signing party by:
decrypting the challenge response using a response decryption key generated using the secret knowledge factor as an input to the password authenticated key exchange protocol to retrieve the response answer, and
verifying the response answer.

18. The method of claim 1, further comprising:
receiving, by the computing system, a rescind message indicating that the signing party rescinds the agreement;
extracting, by the computing system, the biometric sample associated with the electronic agreement; and
communicating, by the computing system to the signing party, the biometric sample, the biometric sample providing that the signing party approved the terms of the electronic agreement and confirmed intent to sign the electronic agreement.

19. A method, comprising:
receiving, by a computing system associated with a relying party, a biometric electronic signature agreement and intent ("BESAI") token, the BESAI token including an encrypted biometric sample received from a signing party, and a signing party identifier in clear text associated therewith;
retrieving, by the computing system, a stored knowledge factor;
generating, by the computing system, a decryption key using the stored knowledge factor as an input to a password authenticated key exchange protocol, the stored knowledge factor based on the signing party identifier;
verifying, by the computing system, the BESAI token by decrypting the BESAI token using the decryption key;
receiving, by the computing system from the signing party, a rescind message;
determining, by the computing system based on the rescind message, whether the signing party rescinds an electronic agreement associated with the BESAI token;
in response to determining the signing party rescinds the electronic agreement, extracting, by the computing system, the biometric sample from the BESAI token; and
transmitting, by the computing system, the biometric sample to the signing party,
wherein the biometric sample comprises at least one of:
an approval sample comprising a first biometric representation of the signing party's approval of terms of the electronic agreement, and
an intent sample comprising a second biometric representation of confirmation of the signing party's intent to sign the electronic agreement.

20. The method of claim 19, further comprising:
matching, by the computing system, the biometric sample with a biometric reference template associated with the signing party identifier;
determining, by the computing system, whether the biometric sample matches the biometric reference template; and
in response to the biometric sample matching the biometric reference template, authenticating, by the computing system, an identity of the signing party.

21. The method of claim 19, wherein the biometric sample is a second biometric sample, the BESAI token further comprising a first biometric sample different from the second biometric sample, the method further comprising:
matching, by the computing system, the first biometric sample with a biometric reference template associated with the signing party identifier;
determining, by the computing system, whether the first biometric sample matches the biometric reference template; and
in response to the first biometric sample matching the biometric reference template, authenticating, by the computing system, an identity of the signing party.

22. The method of claim 19, further comprising:
transmitting, by the computing system to a biometric service provider computing system, a match request, the match request including the signing party identifier and the biometric sample; and
receiving, by the computing system from the biometric service provider computing system, a binary match valve, the binary match value relating to a result, determined by the biometric service provider computing system, of matching the first biometric sample with a biometric reference template associated with the signing party identifier,
wherein an identity of the signing party is determined by the computing system via the binary match value.

23. The method of claim 19, wherein the BESAI token further included a challenge question, the method further comprising:
transmitting, by the computing system to the signing party, a challenge response comprising a response answer to the challenge question, the response answer encrypted using a response key generated using the stored knowledge factor as an input to the password authenticated key exchange protocol; and
mutually authenticating, by the computing system, the relying party and the signing party by:
decrypting the challenge response using a response decryption key generated using the secret knowledge factor as an input to the password authenticated key exchange protocol to retrieve the response answer, and
verifying the response answer.

24. A system, comprising:
a signing party computing system, comprising a processor and instructions stored in non-transitory machine-readable media, the instructions configured to cause the computing system to:

receive a secret knowledge factor;
receive a biometric sample, the biometric sample comprising at least one of:
an approval sample comprising a first biometric representation of the signing party's approval of terms of an electronic agreement, and
an intent sample comprising a second biometric representation of confirmation of the signing party's intent to sign the electronic agreement;
generate an encryption key using the secret knowledge factor as an input to a password authenticated key exchange protocol;
encrypt the biometric sample with the encryption key; and
generate a biometric electronic signature agreement and intent ("BESAI") token including the encrypted biometric sample, and a signing party identifier in clear text associated therewith,
wherein the BESAI token is verified using a decryption key generated using a stored knowledge factor as an input to the password authenticated key exchange protocol, the stored knowledge factor retrieved based on the signing party identifier, the BESAI token being verified by decrypting the BESAI token using the decryption key, and
wherein the approval of the terms of the electronic agreement and confirmation of intent to sign the electronic agreement by the signing party is verified after decrypting the BESAI token.

25. The system of claim 24, wherein an identity of the signing party is authenticated by decrypting the biometric sample from the BESAI token using the decryption key, and matching the decrypted biometric sample with a biometric reference template associated with the signing party identifier.

26. The system of claim 24, wherein the biometric sample is a second biometric sample, the instructions configured to further cause the computing system to:
receive a first biometric sample from the signing party, the first biometric sample different from the second biometric sample; and
encrypt the first biometric sample with the encryption key;
wherein the BESAI token also includes the first biometric sample, and
wherein an identity of the signing party is authenticated by decrypting the encrypted first biometric sample from the BESAI token using the decryption key, and matching the decrypted first biometric sample with a biometric reference template associated with the signing party identifier.

27. The system of claim 26, wherein the first biometric sample includes a biometric access phrase.

28. The system of claim 24, the instructions configured to further cause the computing system to:
encrypt a record of the electronic agreement with the encryption key so as to cryptographically bind the record with the biometric sample,
wherein the BESAI token further includes the encrypted record.

29. The system of claim 24, the instructions configured to further cause the computing system to:
generate a hash of a record of the electronic agreement; and
encrypt the hash of the record with the encryption key so as to cryptographically bind the hash of the record with the biometric sample,
wherein the BESAI token further includes the encrypted hash of the record.

30. The system of claim 29, the instructions configured to further cause the computing system to:
store the record at a storage location identified by a storage location identifier; and
encrypt the storage location identifier with the encryption key so as to cryptographically bind the storage location identifier with each of the hash of the record and the biometric sample, wherein the BESAI token further includes the encrypted storage location identifier.

31. The system of claim 30, wherein the storage location identifier includes a uniform resource identifier to a uniform resource locator where the record is stored.

32. The system of claim 24, wherein receiving the secret knowledge factor comprises extracting the secret knowledge factor from the biometric sample.

33. The system of claim 24, wherein a signing party's identity is authenticated by matching an extracted secret knowledge factor from the BESAI token with the stored knowledge factor.

34. The system of claim 24, the instructions configured to further cause the computing system to:
generate a hash of the record of the electronic agreement and the biometric sample; and
retrieve a time stamp token, the time stamp token including the hash cryptographically bound to a time stamp, wherein the time stamp token may be subsequently validated by verifying that the time stamp token was generated using the hash.

35. The system of claim 34, wherein encrypting the biometric sample further includes cryptographically binding the time stamp token with the biometric sample.

36. The system of claim 24, wherein at least one of the approval sample and the intent sample comprise a confirming phrase.

37. The system of claim 24, wherein the encryption key is a symmetric encryption key generated using a Diffie-Hellman key agreement algorithm.

38. The system of claim 24, wherein the BESAI token further includes a challenge question, the instructions configured to further cause the computing system to:
receive a challenge response comprising a response answer from a relying party to the challenge question, the response answer encrypted using a response key generated using the stored secret knowledge factor known as an input to the password authenticated key exchange protocol; and
mutually authenticate the relying party and the signing party by:
decrypt the challenge response using a response decryption key generated using the secret knowledge factor as an input to the password authenticated key exchange protocol to receive the response answer, and
verify the response answer.

39. The system of claim 24, the instructions configured to further cause the computing system to:
receive a rescind message from the signing party indicating that the signing party rescinds the agreement;
extract, the biometric sample associated with the electronic agreement; and
communicate the biometric sample to the signing party, the biometric sample providing evidence that the signing party approved the terms of the electronic agreement and confirmed intent to sign the electronic agreement.

40. A method, comprising:
- receiving, by a computing system, a first knowledge factor and a second knowledge factor from a signing party;
- transmitting, by the computing system, a request to the signing party to record a biometric sample, the biometric sample comprising at least one of:
  - an approval sample comprising a first biometric representation of the signing party's approval of terms of the electronic agreement, and
  - an intent sample comprising a second biometric representation of confirmation of the signing party's intent to sign the electronic agreement;
- receiving, by the computing system, the biometric sample;
- encrypting in a record of the electronic agreement, by the computing system, the biometric sample, a record identifier, and at least one of the first knowledge factor and the second knowledge factor;
- determining, by the computing system based on a rescind message received from the signing party, whether the signing party rescinds the electronic agreement;
- in response to determining that the signing party rescinds the electronic agreement, decrypting, by the computing system, the record using at least one of the first knowledge factor and the second knowledge factor; and
- extracting, by the computing system, the biometric sample from the record after decrypting the record.

41. The method of claim 40, further comprising:
- transmitting, by the computing system, the biometric sample to the signing party.

42. The method of claim 40, wherein the first knowledge factor comprises a user password, and the second knowledge factor comprises an authentication biometric sample.

43. The method of claim 40, wherein the at least one of the approval sample and the intent sample comprises a confirming phrase.

44. The method of claim 40, further comprising:
- generating, by the computing system, an biometric electronic signature agreement and intent ("BESAI") token including the encrypted record of the electronic agreement.

* * * * *